United States Patent
Wakahara

(10) Patent No.: US 6,904,792 B2
(45) Date of Patent: Jun. 14, 2005

(54) ABNORMALITY DIAGNOSING APPARATUS FOR VEHICLE

(75) Inventor: Keiji Wakahara, Inazawa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/316,159

(22) Filed: Dec. 11, 2002

(65) Prior Publication Data

US 2003/0121316 A1 Jul. 3, 2003

(30) Foreign Application Priority Data

Dec. 27, 2001 (JP) .......................................... 2001-395936

(51) Int. Cl.[7] .......................................... G01M 19/00
(52) U.S. Cl. ...................................... 73/118.1
(58) Field of Search ........................... 73/118.1, 117.2, 73/117.3; 280/757; 701/29, 33; 123/520

(56) References Cited

U.S. PATENT DOCUMENTS

| | | | |
|---|---|---|---|
| 5,297,529 A | | 3/1994 | Cook et al. |
| 5,964,811 A | * | 10/1999 | Ishii et al. ..................... 701/29 |
| 6,085,132 A | * | 7/2000 | Ishii et al. ..................... 701/29 |

FOREIGN PATENT DOCUMENTS

JP          6-147031         5/1994

OTHER PUBLICATIONS

"Attachment II: Modifications to Malfunction and Diagnostic System Requirements for 2004 and Subsequent Model-Year Passenger Cars, Light–Duty Trucks, and Medium-Duty Vehicles and Engines (OBD II), Section 1968.2, Title 13, California Code Regulations", Mar. 8, 2002, p. 10.

* cited by examiner

Primary Examiner—Edward Lefkowitz
Assistant Examiner—Octavia Davis
(74) Attorney, Agent, or Firm—Nixon & Vanderhye P.C.

(57) ABSTRACT

A vehicle ECU performs abnormality diagnoses including a deterioration diagnosis for a catalyst, a leakage diagnosis for an evaporative gas purge system, an abnormality diagnosis for an EGR system, and an abnormality diagnosis for a secondary air introducing system. During abnormality diagnoses, the ECU calculates the performance frequency for each diagnosis. When the performance frequency has reached the required level, the ECU performs the abnormality diagnosis under the normal abnormality diagnosing condition (performance condition, diagnosing method, and judging condition) in order to not adversely affect exhaust emissions, vehicle drivability, etc. If the performance frequency has not reached the required level, the ECU performs the abnormality diagnosis by changing the abnormality diagnosing condition to emphasize an increase of the performance frequency of the abnormality diagnosis, thereby increasing the performance frequency of the abnormality diagnosis. Consequently, it is possible to maintain the performance frequency of the abnormality diagnosis for vehicle systems.

23 Claims, 20 Drawing Sheets

EXAMPLE WHEN PERFORMING LEAKAGE DIAGNOSIS DURING IDLING

ABNORMALITY DIAGNOSING APPARATUS FOR VEHICLE

CROSS REFERENCE TO RELATED APPLICATION

This application is based on, claims the benefit of priority of, and incorporates by reference the contents of prior Japanese Patent Application No. 2001-395936 filed Dec. 27, 2001.

BACKGROUND OF THE INVENTION

1. Field of the Invention

The present invention relates to an abnormality diagnosing apparatus for a vehicle that diagnoses the presence or absence of an abnormality in a specific component or system mounted on the vehicle.

2. Description of the Related Art

Generally, in order to improve vehicle reliability, today's computerized vehicles perform abnormality diagnoses of various kinds including, for example, a catalyst deterioration diagnosis for diagnosing the presence or absence of deterioration in a catalyst for purifying an exhaust gas, an evaporative gas leakage diagnosis for diagnosing the presence or absence of leakage in an evaporative gas purge system for purging (releasing) an evaporative gas (fuel evaporative emission) from inside the fuel tank to an intake system, etc. These abnormality diagnoses are performed under a pre-set, particular abnormality diagnosing condition (performance condition, diagnosing method, and judging condition) so as not to adversely affect the drivability, exhaust emission, etc.

However, use environments, driving methods, and running patterns of the vehicle vary from user to user. Therefore, when the abnormality diagnosis is performed under the pre-set particular abnormality diagnosing condition (performance condition, diagnosing method, and judging condition) by a conventional abnormality diagnosing apparatus as described above, the abnormality diagnosis may be performed less frequently (or the abnormality diagnosis may be started, but aborted more frequently before it has been completed) depending on the use environments, driving method, and running pattern of the vehicle. This potentially reduces the performance frequency of the abnormality diagnosis to an extremely low level. For this reason, should an abnormality occur, the abnormality diagnosing apparatus may fail to detect the abnormality at an early stage.

SUMMARY OF THE INVENTION

The invention was devised in view of the foregoing, and therefore, has an object to provide an abnormality diagnosing apparatus for a vehicle capable of ensuring the performance frequency of an abnormality diagnosis under the condition that the conventional abnormality diagnosing method fails to ensure the performance frequency of an abnormality diagnosis sufficiently, and therefore, is capable of detecting an abnormality at an early stage in the event the abnormality occurs.

In order to achieve the above and other objects, an abnormality diagnosing apparatus according to a first aspect of the invention is configured in such a manner that a performance frequency calculating means calculates a performance frequency of an abnormality diagnosis performed by an abnormality diagnosing means, and at least one abnormality diagnosing condition selected from a performance condition, a diagnosing method, and a judging condition for the abnormality diagnosis to be performed by the abnormality diagnosing means is changed according to the performance frequency thus calculated. When the abnormality diagnosing apparatus is configured in this manner, the performance frequency of the abnormality diagnosis is monitored, and in a case where the performance frequency is judged as being insufficient, the abnormality diagnosis is performed by changing the abnormality diagnosing condition (performance condition, diagnosing method, and judging condition) so as to increase the performance frequency, whereby the performance frequency of the abnormality diagnosis is increased. As a result, the performance frequency of the abnormality diagnosis can be ensured under the condition that the conventional abnormality diagnosing method fails to ensure the performance frequency of the abnormality diagnosis sufficiently. Hence, should an abnormality occur, the abnormality can be detected at an early stage.

In this case, according to a second aspect of the invention, when the performance frequency calculated by the performance frequency calculating means has not reached a certain required level, the abnormality diagnosing condition may be changed so as to increase the performance frequency. When the abnormality diagnosing apparatus is configured in this manner, the performance frequency can be increased to the required level in a reliable manner under the condition that the conventional abnormality diagnosing method fails to increase the performance frequency to the required level.

The abnormality diagnosing apparatus of the invention can be applied to an abnormality diagnosis for various components and systems mounted on the vehicle. According to a third aspect of the invention, for example, the invention may be applied to a catalyst deterioration diagnosis for diagnosing the presence or absence of deterioration in a catalyst for purifying an exhaust gas. When the abnormality diagnosing apparatus is configured in this manner, the performance frequency of the catalyst deterioration diagnosis can be ensured under the condition that the conventional catalyst deterioration diagnosing method fails to ensure the performance frequency of the catalyst deterioration diagnosis sufficiently. Therefore, deterioration in the catalyst can be detected at an early stage.

Also, according to a fourth aspect of the invention, when the abnormality diagnosing apparatus includes an evaporative gas purge system for purging an evaporative gas, which is generated when fuel inside a fuel tank evaporates, from the inside of the fuel tank to an intake system of an internal combustion engine, the invention may be applied to a leakage diagnosis for diagnosing the presence or absence of leakage in an evaporation system including the fuel tank. When the abnormality diagnosing apparatus is configured in this manner, the performance frequency of the leakage diagnosis can be ensured under the condition that the conventional leakage diagnosing method fails to sufficiently ensure the performance frequency of the leakage diagnosis. Hence, should leakage occur, the leakage can be detected at an early stage.

Incidentally, the leakage diagnosis for the evaporation system can be performed either while the internal combustion engine is operating or stopped. However, when the leakage diagnosis is performed while the internal combustion engine is stopped, power of the battery serving as a power source is consumed. Hence, if the leakage diagnosis is performed frequently while the internal combustion engine is stopped, load applied to the battery becomes so large that the battery may be exhausted.

Hence, according to a fifth aspect of the invention, it may be configured in such a manner that a leakage diagnosis for the evaporation system is performed only while the internal combustion engine is operating when the performance frequency calculated by the performance frequency calculating means has reached a certain required level, and the leakage diagnosis for the evaporation system is performed while the internal combustion engine is stopped when the performance frequency has not reached the certain required level. When the abnormality diagnosing apparatus is configured in this manner, only in the case where the performance frequency will not reach the required level by merely performing the leakage diagnosis while the internal combustion engine is operating, the leakage diagnosis is performed also while the internal combustion engine is stopped to increase the performance frequency to reach the required level. Since this configuration can reduce the performance frequency of the leakage diagnosis while the internal combustion engine is stopped to the least necessary level, not only can the performance frequency of the leakage diagnosis be ensured, but also battery depletion can be prevented.

The leakage diagnosis for the evaporation system can be performed while the internal combustion engine is operating, that is, either while the vehicle is idling (not moving) or running (moving). However, since the leakage diagnosis during running is susceptible to the operating state of the internal combustion engine, the driving state, the state of roads, the altitude of the roads (change in the atmospheric pressure), etc., it is preferable to perform the leakage diagnosis during idling in achieving the more accurate leakage diagnosis.

Hence, according to a sixth aspect of the invention, it may be configured in such a manner that leakage diagnosis for the evaporation system is performed only while the internal combustion engine is idling when the performance frequency calculated by the performance frequency calculating means has reached a certain required level, and the leakage diagnosis for the evaporation system is performed also under operating conditions other than idling when the performance frequency has not reached the certain required level. When the abnormality diagnosing apparatus is configured in this manner, by performing the leakage diagnosis for the evaporation system only while the internal combustion engine is operating, not only can the performance frequency of the leakage diagnosis be ensured, but also the accuracy of the diagnosis can be ensured.

Also, according to a seventh aspect of the invention, when the abnormality diagnosing apparatus includes an exhaust gas recirculation system (EGR system) for recirculating part of the exhaust gas from an internal combustion engine into an intake system, the invention may be applied to an EGR abnormality diagnosis for diagnosing the presence or absence of an abnormality in the EGR system. When the abnormality diagnosing apparatus is configured in this manner, the performance frequency of the EGR abnormality diagnosis can be ensured under the condition that the conventional EGR abnormality diagnosing method fails to ensure the frequency of the EGR abnormality diagnosis sufficiently. Hence, should an abnormality occur in the EGR system, the abnormality can be detected at an early stage of the abnormality.

Further, according to an eighth aspect of the invention, when the abnormality diagnosing apparatus includes a secondary air introducing system for introducing secondary air into an exhaust channel of an internal combustion engine, the invention may be applied to a secondary air abnormality diagnosis for diagnosing the presence or absence of an abnormality in the secondary air introducing system. When it is configured in this manner, the performance frequency of the secondary air abnormality diagnosis can be ensured under the condition that the conventional secondary air abnormality diagnosing method fails to ensure the performance frequency of the secondary air abnormality diagnosis sufficiently. Hence, should an abnormality occur in the secondary air introducing system, the abnormality can be detected at an early stage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
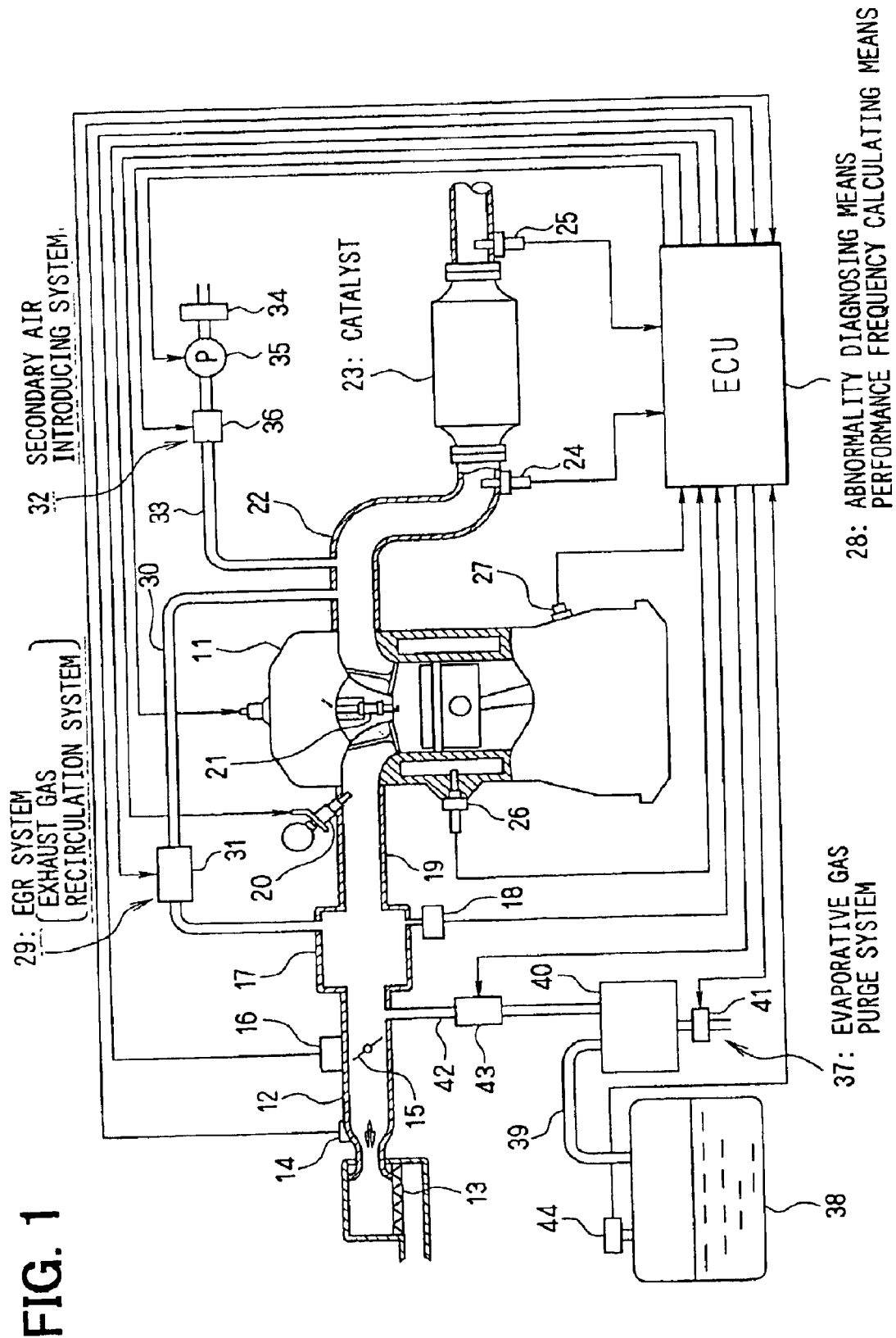
FIG. 1 is a schematic view showing a configuration of an overall engine control system according to one embodiment of the invention.

The following description will describe one embodiment of the invention with reference to the accompanying drawings. Firstly, a schematic configuration of an overall engine control system will be explained with reference to FIG. 1. An air cleaner 13 is provided at the most upstream portion in an intake pipe 12 of an internal combustion engine 11. An air flowmeter 14 for detecting a quantity of intake air is provided at the downstream side of the air cleaner 13. A throttle valve 15 and a throttle opening sensor 16 for detecting a throttle opening are provided at the downstream side of the air flowmeter 14.

Further, a surge tank 17 is provided at the downstream side of the throttle valve 15, and the surge tank 17 is provided with an intake pipe pressure sensor 18 for detecting an intake pipe pressure. The surge tank 17 is also provided with an intake manifold 19 for introducing air into the respective cylinders of the engine 11, and fuel injection valves 20 for injecting fuel into the respective cylinders are attached in close proximity to the corresponding intake ports of the intake manifold 19.

Also, an ignition plug 21 is attached to the cylinder head of the engine 11 for each of the cylinders, and a mixed gas inside each cylinder is ignited by a spark discharge from the corresponding ignition plug 21. A cooling water temperature sensor 26 for detecting the temperature of cooling water and a crank angle sensor 27 for detecting an engine rotational speed are attached to the cylinder block of the engine 11.

On the other hand, a catalyst 23 made of a three way catalyst or the like for reducing CO, HC, NOx, etc. in an exhaust gas is provided in an exhaust pipe 22 of the engine 11. Sensors 24 and 25 (a linear air-fuel ratio sensor, an oxygen sensor, etc.) for detecting an air-fuel ratio or a rich/lean state of an exhaust gas are provided respectively at the upstream side and the downstream side of the catalyst 23.

Next, configurations of an EGR system 29 (Exhaust Gas Recirculation system), a secondary air introducing system 32, and an evaporative gas purge system 37 will be explained individually. With regard to the EGR system 29, an EGR pipe 30 for recirculating part of the exhaust gas to the intake side is connected somewhere between the upstream side of the catalyst 23 in the exhaust pipe 22 and the downstream side of the throttle valve 15 in the intake pipe 12. An EGR valve 31 for controlling a quantity (EGR quantity) of an exhaust gas to be recirculated is provided at some midpoint in the EGR pipe 30.

In regard to the secondary air introducing system 32, a secondary air introducing pipe 33 for introducing outside air as secondary air is connected to the upstream side of the catalyst 23 in the exhaust pipe 22. An air filter 34 is provided at the uppermost stream portion in the secondary air introducing pipe 33. An air pump 35 for pumping up or increasing the volume of the secondary air is provided at the downstream side of the air filter 34, and a valve 36 is provided at the downstream side of the air pump 35. The position at which the secondary air is introduced into the exhaust pipe 22 through the secondary air introducing pipe 33 is set at a range such that the temperature of an exhaust gas inside the exhaust pipe 22 is as high as or higher than the temperature (for example, 700° C.) at which rich components, such as HC, in the exhaust gas can burn.

Next, the configuration of the evaporative gas purge system 37 will be explained. A canister 40 is connected to a fuel tank 38 via an evaporation channel 39. The canister 40 accommodates an absorbent (not shown), such as activated carbon, for absorbing an evaporative gas (fuel evaporative emission), and an atmospheric air communication hole in the canister 40 is opened and closed by an atmospheric air opening and closing valve 41. A purge channel 42 can purge (release) an evaporative gas absorbed in the absorbent accommodated in the canister 40 from the absorbent to the intake pipe 12 and is provided between the canister 40 and the intake pipe 12. A purge control valve 43 can control a quantity of purged flow and is provided at some midpoint in the purge channel 42. Also, the fuel tank 38 is provided with a tank internal pressure sensor 44 for detecting an internal pressure thereof. When an evaporation system from the inside of the fuel tank 38 to the purge control valve 43 is sealed in an airtight fashion, the internal pressure of the fuel tank 38 is equal to the internal pressure at any other portion in the evaporation system. Hence, the pressure in the evaporation system can be detected by detecting the internal pressure (hereinafter, referred to as the tank internal pressure) of the fuel tank 38 using the tank internal pressure sensor 44.

Outputs from the aforementioned various sensors are input into an engine control circuit (hereinafter, referred to as the ECU) 28. The ECU 28 is a microcomputer-based unit, and controls a quantity of fuel to be injected through the fuel injection valves 20 and the ignition timing of the ignition plugs 21 depending on the operating state of the engine by running various control programs pre-installed in an internal ROM (storage medium).

The ECU 28 runs various abnormality diagnosis programs pre-installed in the ROM, which will be described below, and thereby performs: a catalyst deterioration diagnosis for diagnosing the presence or absence of deterioration in the catalyst 23; a leakage diagnosis for diagnosing the presence or absence of leakage of an evaporative gas in the evaporative gas purge system 37; an EGR abnormality diagnosis for diagnosing the presence or absence of an abnormality in the EGR system 29; a secondary air abnormality diagnosis for diagnosing the presence or absence of an abnormality in the secondary air introducing system 32. The ECU 28 thus plays a role in diagnosing an abnormality.

Figure 2:
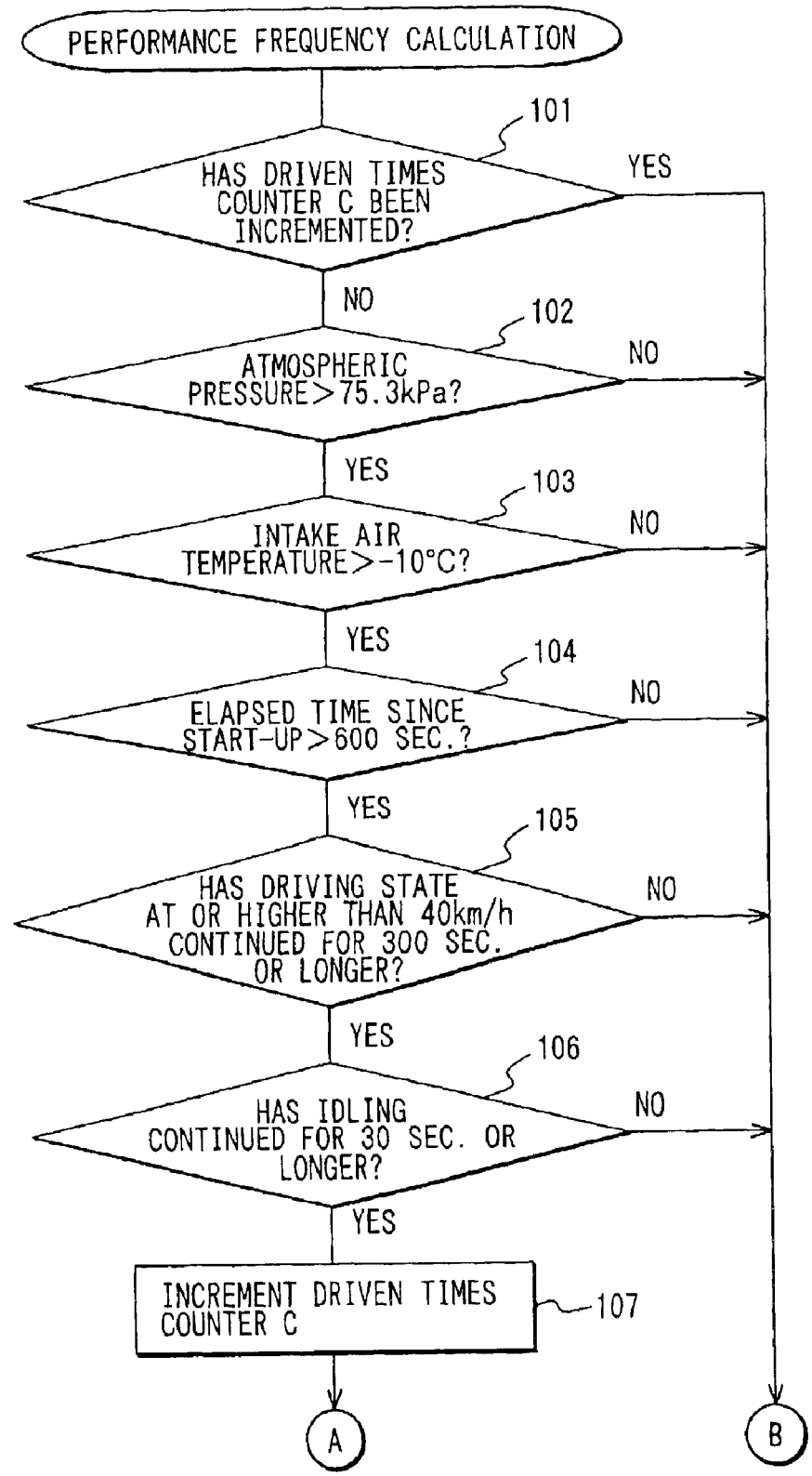
FIG. 2 is a flowchart (#1) detailing the flow of processing by a program for performance frequency calculation.
Figure 3:
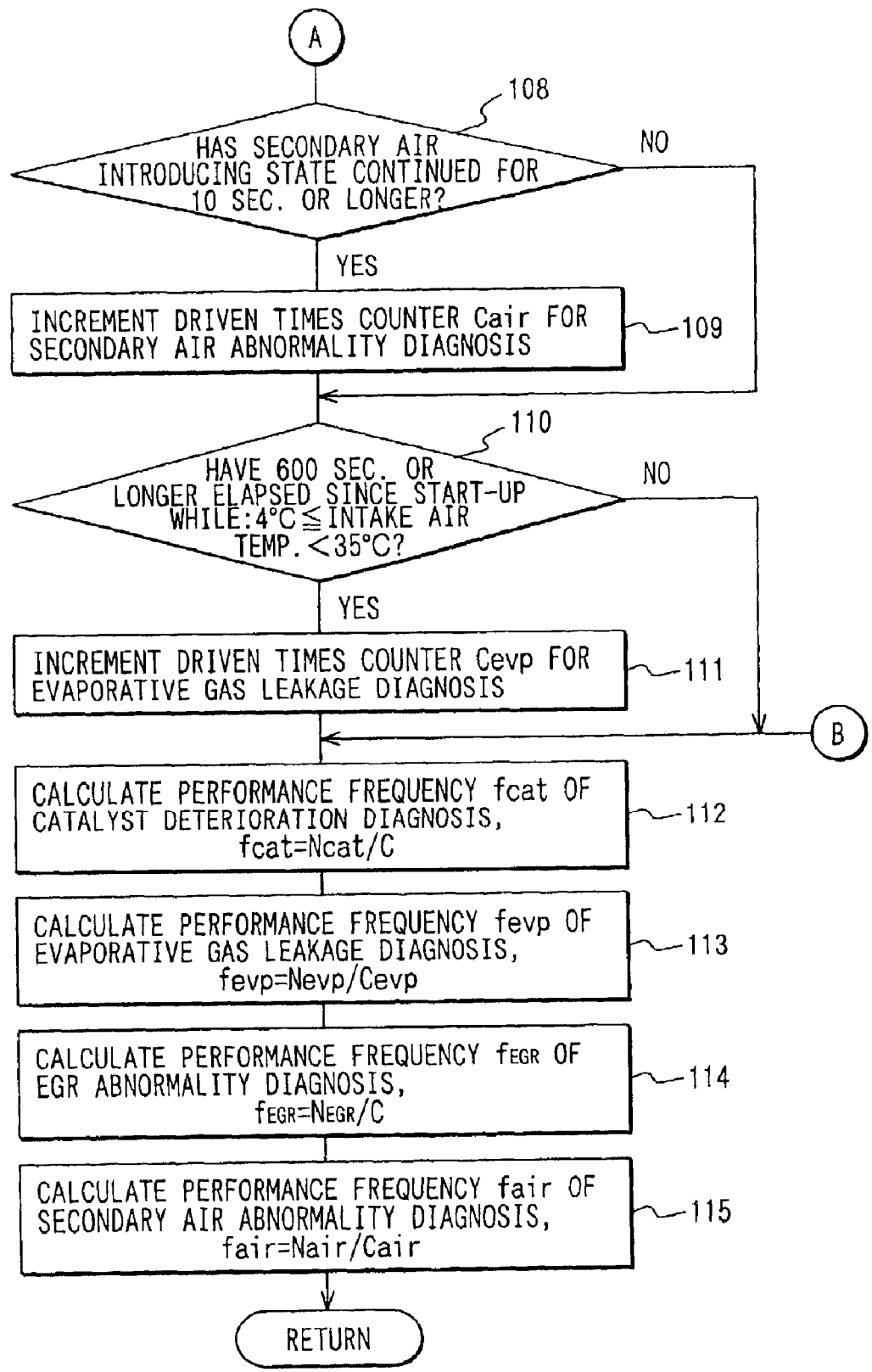
FIG. 3 is a flowchart (#2) detailing the flow of processing by the program for performance frequency calculation.

When performing these diagnoses, the ECU 28 runs a program for performance frequency calculation detailed in FIGS. 2 and 3, and calculates performance frequency fcat of the catalyst deterioration diagnosis, performance frequency fevp of the leakage diagnosis, performance frequency fEGR of the EGR abnormality diagnosis, and performance frequency fair of the secondary air abnormality diagnosis.

Figure 4:
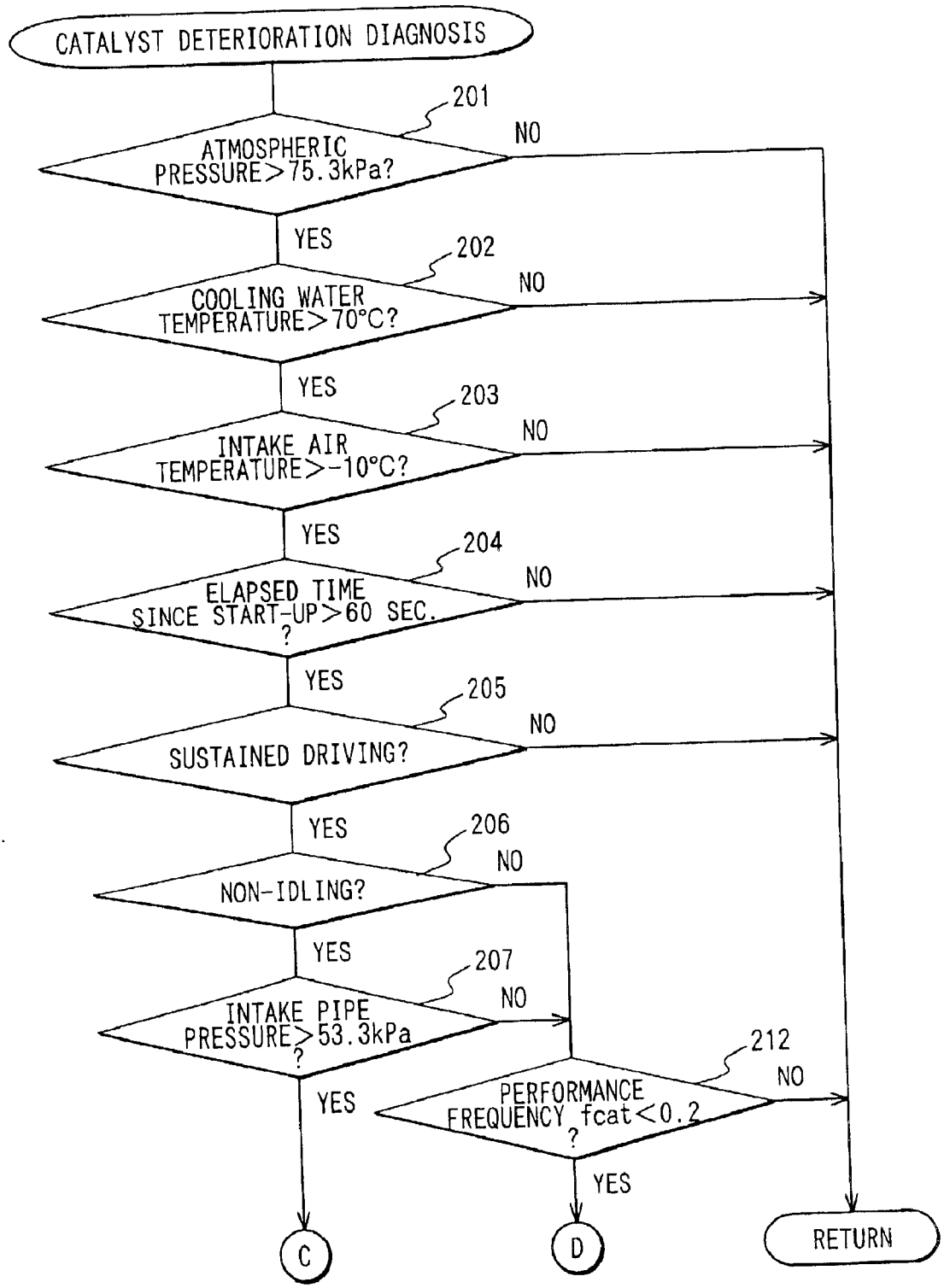
FIG. 4 is a flowchart (#1) detailing the flow of processing by a program for catalyst deterioration diagnosis.
Figure 5:
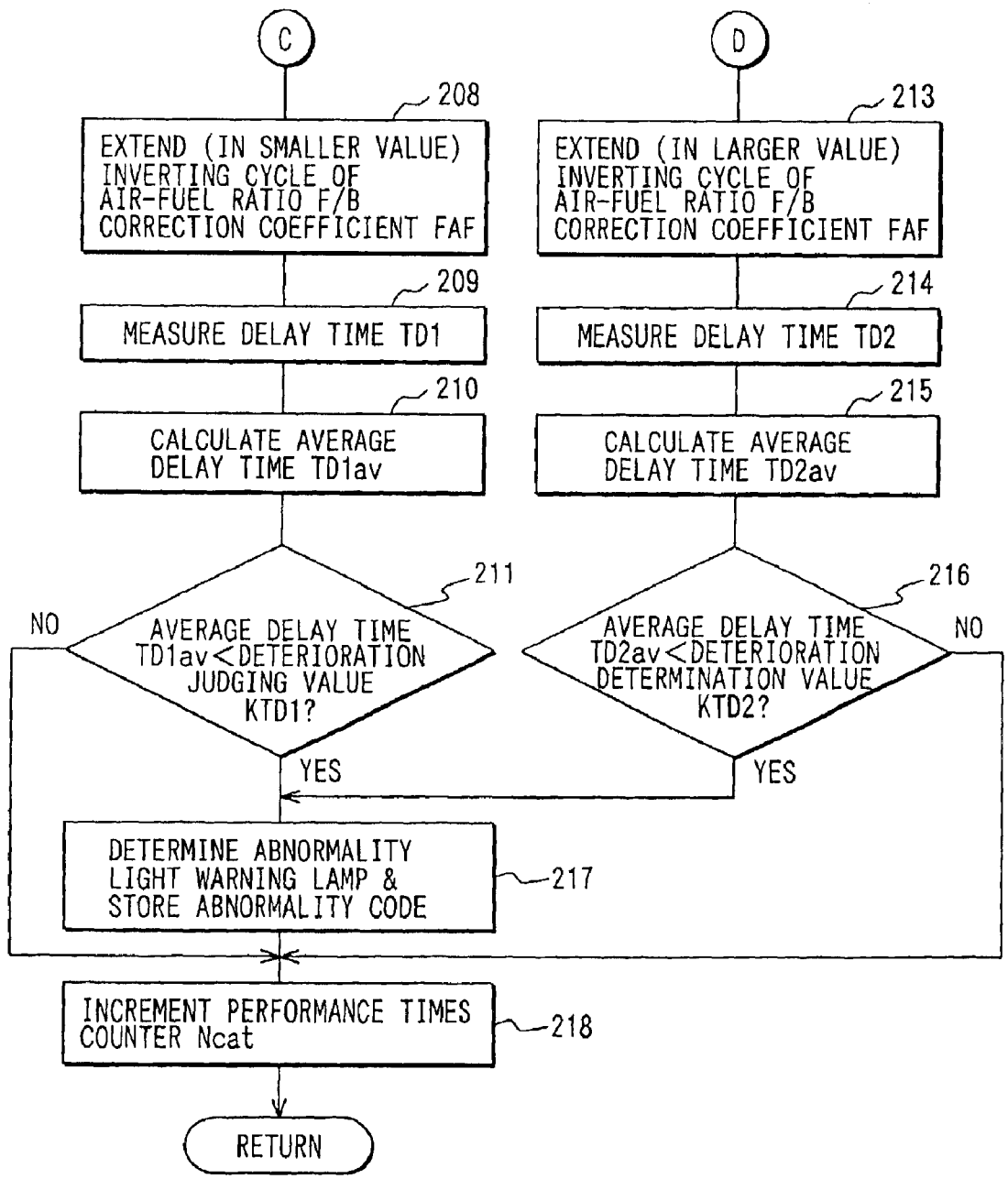
FIG. 5 is a flowchart (#2) detailing the flow of processing by the program for the catalyst deterioration diagnosis.

Then, the ECU 28 runs a program for a catalyst deterioration diagnosis detailed in FIGS. 4 and 5. Accordingly, it performs only a catalyst deterioration diagnosis during medium to high load driving when the performance frequency fcat of the catalyst deterioration diagnosis has reached the required level. When the performance frequency fcat of the catalyst deterioration diagnosis has not reached the required level, it expands the extent within which the performance condition for the catalyst deterioration diagnosis is established, and performs both the catalyst deterioration diagnosis during medium to high load driving and a catalyst deterioration diagnosis during idling or low load driving, thereby increasing the performance frequency fcat of the catalyst deterioration diagnosis.

The ECU 28 also runs respective programs for a leakage diagnosis for the evaporation system detailed in FIGS. 7 through 11. Accordingly, it performs only a leakage diagnosis during idling when the performance frequency fevp of the leakage diagnosis has reached the required level. When the performance frequency fevp of the leakage diagnosis has not reached the required level, it expands the extent within which the performance condition for the leakage diagnosis is established, and performs both the leakage diagnosis during idling and a leakage diagnosis at engine stop, thereby increasing the performance frequency fevp of the leakage diagnosis. When performing the leakage diagnosis during engine stoppage, the ECU 28 runs a main relay control program (not shown), and supplies power from the battery to components (ECU 28, atmospheric air opening and closing valve 41, tank internal pressure sensor 44, etc.) necessary to perform the leakage diagnosis after the engine is stopped (after the ignition switch is turned OFF).

The ECU 28 also runs respective programs for an EGR abnormality diagnosis detailed in FIGS. 14 through 18. Accordingly, it performs only an EGR abnormality diagnosis during fuel shutoff for speed reduction when the performance frequency fEGR of the EGR abnormality diagnosis has reached the required level. When the performance frequency fEGR of the EGR abnormality diagnosis has not reached the required level, it expands the extent within which the performance condition for the EGR abnormality diagnosis is established, and performs both the EGR abnormality diagnosis during fuel shutoff for speed reduction and an EGR abnormality diagnosis during maintained driving, thereby increasing the performance frequency fEGR of the EGR abnormality diagnosis.

Figure 21:
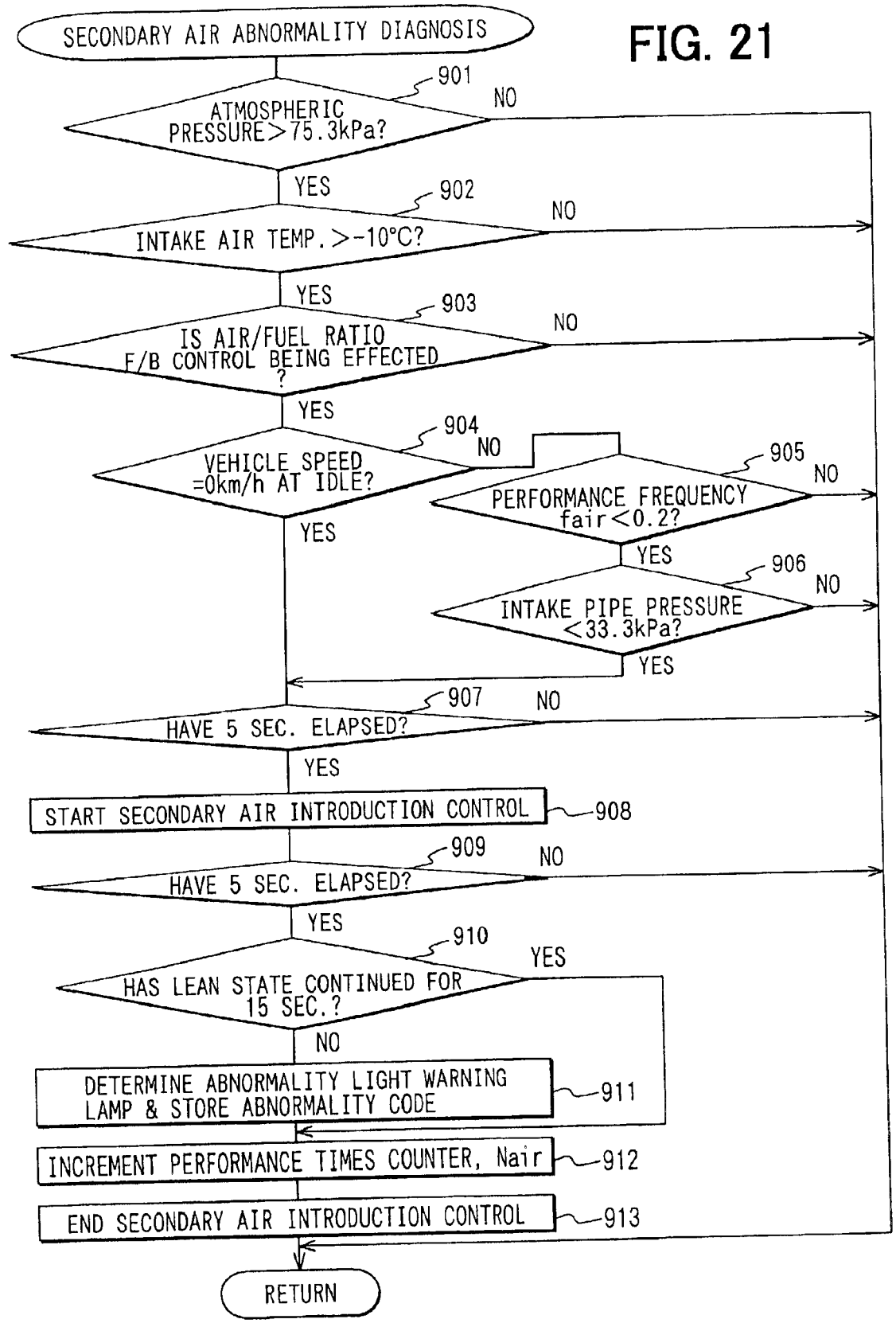
FIG. 21 is a flowchart showing the flow of processing by a program for a secondary air abnormality diagnosis.

The ECU 28 further runs a program for a secondary air abnormality diagnosis detailed in FIG. 21. Accordingly, it performs only a secondary air abnormality diagnosis during idling when the performance frequency fair of the secondary air abnormality diagnosis has reached the required level. When the performance frequency fair of the secondary air abnormality diagnosis has not reached the required level, it expands the extent within which the performance condition for the secondary air abnormality diagnosis is established, and performs both the secondary air abnormality diagnosis during idling and a secondary air abnormality diagnosis during low load driving, thereby increasing the performance frequency fair of the secondary air abnormality diagnosis.

The processing contents of the respective programs run by the ECU 28 will be explained in the following.

[Performance Frequency Calculation]

The program for performance frequency calculation detailed in FIGS. 2 and 3 is run repetitively at regular intervals while the power of the ECU 28 stays ON, and thereby plays a role in calculating performance frequency. In the present embodiment, an explanation will be given in accordance with the performance frequency calculation specified in the regulatory-reform bill MSC-0110 of the US regulation for DB-II.

When this program is initiated, whether an increment condition for a driven times counter C is established or not is judged first in Steps 101 through 106. Here, the increment condition for the driven times counter C is established, for example, when all the following conditions (1) through (6) are satisfied.

(1) The driven times counter C has not been incremented since the power of the ECU 28 was turned ON this time (Step 101).

(2) The atmospheric pressure is higher than a certain pressure (for example, 75.3 kPa), that is, the vehicle is not running in a high elevation (Step 102).

(3) The temperature of intake air is higher than a certain temperature (for example, −10° C.) (Step 103).

(4) An elapsed time since the start-up is longer than a certain time (for example, 600 sec.) (Step 104).

(5) A driving state at or higher than a certain speed (for example, 40 km/h) has continued for a certain time (for example, 300 sec.) or longer (Step 105).

(6) Idling has continued for a certain time (for example, 30 sec.) or longer (Step 106).

When all the foregoing conditions (1) through (6) are satisfied, the increment condition for the driven times counter C is established. However, when any of the foregoing conditions (1) through (6) is not satisfied, the increment condition for the driven times counter C fails to be established, and the performance frequency calculation processing (Steps 112 through 115 in FIG. 3) to be described below is performed without incrementing the driven times counter C. On the other hand, when the increment condition for the driven times counter C is established, from the judgment that driving including a typical driving mode under normal circumstances is performed, the flow proceeds to Step 107, where the driven times counter C is incremented.

Subsequently, the flow proceeds to Step S108 in FIG. 3, where whether the secondary air introduction control has been practically performed is judged by judging whether a secondary air introducing state has continued for a certain time (for example, 10 sec.) or longer. When judged as "Yes," the flow proceeds to Step 109, where a driven times counter Cair for the secondary air abnormality diagnosis is incremented.

Then, the flow proceeds to Step 110, where whether a certain time (for example, 600 seconds) has elapsed since the start-up while the temperature of the intake air remains within a certain range (for example, 4° C.≦intake air temperature<35° C.). When judged as "Yes," the flow proceeds to Step 111, where a driven times counter Cevp for the leakage diagnosis for the evaporation system is incremented. The driven times may simply be the number of start-ups. Alternatively, in the case of using means for measuring days and hours, the number of days or hours may be used.

After the driven times counter Cevp for the leakage diagnosis for the evaporation system is incremented in Step 111, the performance frequency fcat of the catalyst deterioration diagnosis, the performance frequency fevp of the leakage diagnosis, the performance frequency fEGR of the EGR abnormality diagnosis, and the performance frequency fair of the secondary air abnormality diagnosis are calculated respectively in Steps 112 through 115 as follows.

Firstly, in Step 112, the performance frequency fcat of the catalyst deterioration diagnosis is calculated by dividing the performance times Ncat of the catalyst deterioration diagnosis by the driven times C. The performance times Ncat of the catalyst deterioration diagnosis is incremented each time the catalyst deterioration diagnosis is performed by running a program for a catalyst deterioration diagnosis detailed in FIGS. 4 and 5 to be described below.

$$fcat=Ncat/C$$

Then, the flow proceeds to Step 113, where the performance frequency fevp of the leakage diagnosis is calculated by dividing the performance times Nevp of the leakage diagnosis by the driven times Cevp for the leakage diagnosis. The performance times Nevp of the leakage diagnosis is incremented each time the leakage diagnosis is performed by running a program for a leakage diagnosis during idling, which is detailed in FIGS. 8 and 9, or a program for a leakage diagnosis at engine stop which is detailed in FIGS. 10 and 11, which is described below.

$$fevp=Nevp/Cevp$$

Then, the flow proceeds to Step 114, where the performance frequency fEGR of the EGR abnormality diagnosis is calculated by dividing the performance times NEGR of the EGR abnormality diagnosis by the driven times C. The performance times NEGR of the EGR abnormality diagnosis is incremented each time the EGR abnormality diagnosis is performed by running a program for an EGR abnormality diagnosis at fuel shutoff for speed reduction detailed in FIGS. 15 and 16 or a program for an EGR abnormality diagnosis during maintained driving which is detailed in FIGS. 17 and 18 to be described below.

$$fEGR=NEGR/C$$

Then, the flow proceeds to Step 115, where the performance frequency fair of the secondary air abnormality diagnosis is calculated by dividing the performance times Nair of the secondary air abnormality diagnosis by the driven times Cair for the secondary air abnormality diagnosis. The performance times Nair of the secondary air abnormality diagnosis is incremented each time the secondary air abnormality diagnosis is performed by running a program for a secondary air abnormality diagnosis detailed in FIG. 21 to be described below.

$$fair=Nair/Cair$$

[Catalyst Deterioration Diagnosis]

Next, the catalyst deterioration diagnosis performed by running the program for the catalyst deterioration diagnosis detailed in FIGS. 4 and 5 will be explained. The ECU 28 performs the air-fuel ratio feedback (hereinafter, feedback is referred to as F/B) control, during which it calculates, for example, an air-fuel ratio F/B correction coefficient FAF used to correct an air-fuel ratio (quantity of fuel to be injected) based on the output from the upstream sensor 24, so that an air-fuel ratio of an exhaust gas at the upstream location of the catalyst 23 will stay at the target air-fuel ratio.

Figure 6:
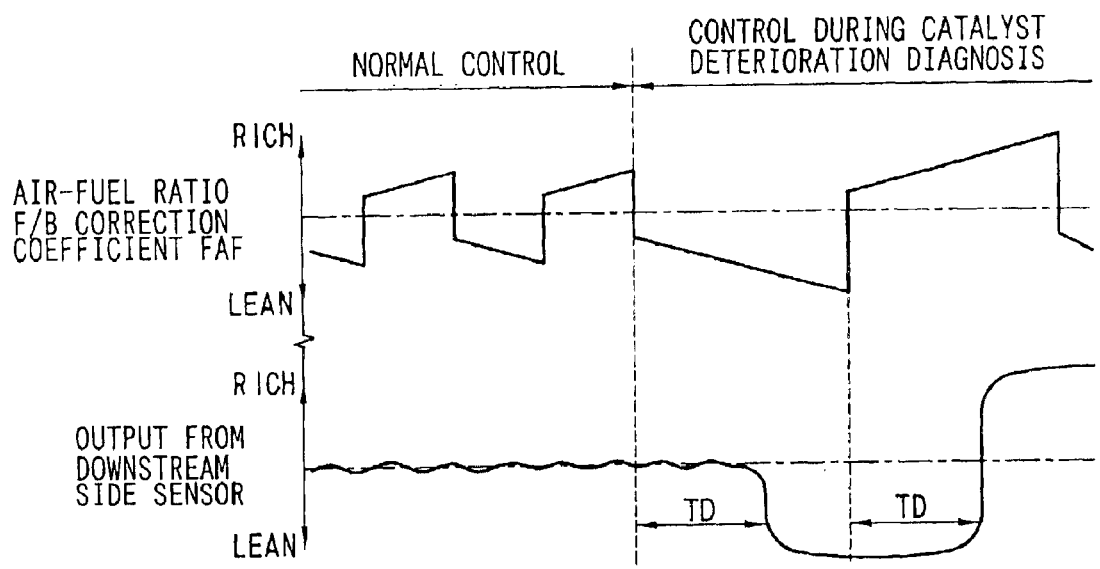
FIG. 6 is a view explaining a catalyst deterioration diagnosing method.

According to the normal air-fuel ratio F/B control, the air-fuel ratio of the exhaust gas at the upstream location of the catalyst 23 is maintained near the target air-fuel ratio by inverting the rich/lean state of the air-fuel ratio F/B correction coefficient FAF each time the rich/lean state of the output from the upstream sensor 24 inverts. Consequently, the exhaust gas is purified in a satisfactory manner while it passes through the catalyst 23, and the air-fuel ratio of the exhaust gas flowing out from the catalyst 23 thus nears the stoichiometric air-fuel ratio. Hence, the output from the downstream sensor 25 is maintained near the stoichiometric air-fuel ratio. As shown in FIG. 6, when the lean-to-rich inverting cycle of the air-fuel ratio F/B correction coefficient FAF is extended during the catalyst deterioration diagnosis, a quantity of absorption of the lean component/rich component of the catalyst 23 reaches saturation, and the behavior of the air-fuel ratio F/B correction coefficient FAF appears as a change in the output from the downstream sensor 25.

Therefore, the more the catalyst 23 deteriorates, the less quantity the catalyst 23 absorbs until it becomes saturated. For this reason, a delay time TD, since the air-fuel ratio F/B correction coefficient FAF is inverted until the output from the downstream sensor 25 inverts, becomes shorter. By exploiting this characteristic, when the catalyst deterioration diagnosis is performed, the delay time TD of the output from the downstream sensor 25 is measured by extending the inverting cycle of the air-fuel ratio F/B correction coefficient FAF. Then, the presence or absence of deterioration in the catalyst 23 is diagnosed by comparing the delay time TD thus measured with a certain deterioration judging value.

The program for the catalyst deterioration diagnosis detailed in FIGS. 4 and 5 for performing the catalyst deterioration diagnosis as described above is run repetitively at regular intervals after the ignition switch (not shown) is turned ON. When this program is initiated, whether the performance condition for the catalyst deterioration diagnosis during medium to high load driving is established or not is judged first in Steps 201 through 207. Here, the performance condition for the catalyst deterioration diagnosis during medium to high load driving is established when all the following conditions (1) through (6) are satisfied.

(1) The atmospheric pressure is higher than a certain pressure (for example, 75.3 kPa), that is, the vehicle is not running at a high altitude (Step 201).

(2) The temperature of cooling water is higher than a certain temperature (for example, 70° C.) (Step 202).

When the condition (2) is satisfied, it can be judged that the catalyst 23 and the upstream and downstream sensors 24 and 25 are in the heating state (activated state), and that the air-fuel ratio F/B control has already started.

(3) The temperature of intake air is higher than a certain temperature (for example, −10° C.) (Step 203).

(4) An elapsed time since the start-up is longer than a certain time (for example, 60 seconds) (Step 204).

(5) The driving remains constant, that is, the vehicle is driven at a relatively stable air-fuel ratio (Step 205).

(6) The vehicle is not idling but running with an intake pipe pressure being higher than a certain pressure (for example, 53.3 kPa), that is, during medium to high load driving (Steps 206 and 207).

Only a small quantity of exhaust gas flows into the catalyst 23 during idling or low load driving, and it takes longer until the catalyst 23 saturates. Hence, unless the inverting cycle of the air-fuel ratio F/B correction coefficient FAF is extended considerably, the catalyst 23 will not saturate, and the behavior of the air-fuel ratio F/B correction coefficient FAF will not appear as a change in the output from the downstream side sensor 25. However, extending the inverting cycle of the air-fuel ratio F/B correction coefficient FAF too long during the catalyst deterioration diagnosis adversely affects exhaust emission.

This is the reason why the condition (6), that is, during medium to high load driving, is provided as one of the conditions that need to be satisfied to establish the performance condition for the catalyst deterioration diagnosis. During medium to high load driving, a large quantity of an exhaust gas flows into the catalyst 23, and the catalyst 23 saturates in a relatively short time without the need to extend the inverting cycle of the air-fuel ratio F/B correction coefficient FAF considerably during the catalyst deterioration diagnosis. Hence, the behavior of the air-fuel ratio F/B correction coefficient FAF will appear as a change in the output from the downstream sensor 25. The catalyst deterioration diagnosis can thus be performed based on the output from the downstream sensor 25 while adverse affects on exhaust emission are suppressed.

When all the foregoing conditions (1) through (6) are satisfied, the performance condition for the catalyst deterioration diagnosis during medium to high load driving is established. The flow then proceeds to Step 208 in FIG. 5 from Step 207 to perform the catalyst deterioration diagnosis during medium to high load driving which is described below.

On the other hand, when any of the foregoing conditions (1) through (6) is not satisfied, the performance condition for the catalyst deterioration diagnosis during medium to high load driving fails to be established. However, when all the conditions (1) through (5) are satisfied (that is, only condition (6) is not satisfied), the flow proceeds to Step 212 from Step 206 or 207, where judgment is made as to whether the performance frequency fcat of the catalyst deterioration diagnosis calculated by the aforementioned program for performance frequency calculation detailed in FIGS. 2 and 3 is below the required level (for example, 0.2). When the performance frequency fcat of the catalyst deterioration diagnosis is judged as having not reached the required level, the performance frequency fcat of the catalyst deterioration diagnosis needs to be increased. Thus, the performance condition for the catalyst deterioration diagnosis during idling or low load driving is established, and the flow proceeds to Step 213 in FIG. 5 to perform the catalyst deterioration diagnosis during idling or low load driving which is described below.

On the contrary, when the performance frequency fcat of the catalyst deterioration diagnosis is judged as having reached the required level in Step 212, the program is terminated without performing the catalyst deterioration diagnosis during idling or low load driving which is described below.

When the aforementioned performance condition for the catalyst deterioration diagnosis during medium to high load driving is established and the flow thereby proceeds to Step 208 in FIG. 5 from Step 207 in FIG. 4, the catalyst deterioration diagnosis during medium to high load driving is performed as follows. That is, in Step 208, the inverting cycle of the air-fuel ratio F/B correction coefficient FAF is extended by changing a delay constant for the air-fuel ratio F/B control. In this case, an increase (extension) in the inverting cycle of the air-fuel ratio F/B correction coefficient FAF for the catalyst deterioration diagnosis during medium to high load driving is set to a value smaller than an increase in the inverting cycle of the air-fuel ratio F/B correction coefficient FAF for the catalyst deterioration diagnosis during idling or low load driving which is described below.

Subsequently, the flow proceeds to Step 209, where the processing for measuring a delay time TD1 since the air-fuel ratio F/B correction coefficient FAF is inverted until the output from the downstream side sensor 25 inverts is repeated a certain number of times (for example, ten times). Then, the flow proceeds to Step 210, where an average delay time TD1av of these measured delay times TD1 is calculated.

Subsequently, the flow proceeds to Step 211, where whether the average delay time TD1av is shorter than a certain deterioration judging value KTD1 is judged. In this case, the deterioration judging value KTD1 to be compared with the average delay time TD1av for the catalyst deterioration diagnosis during medium to high load driving is set to a time shorter than a deterioration judging value KTD2 to be compared with an average delay time TD2av for the catalyst deterioration diagnosis during idling or low load driving which is described below.

In Step 211, when the average delay time TD1av is judged as being shorter than the deterioration judging value KTD1, the flow proceeds to Step 217. Then, the presence of deterioration (abnormality) in the catalyst 23 is judged, and a warning lamp (not shown) is lit to warn the driver while an abnormality code representing the catalyst deterioration is stored into a back-up RAM (not shown) in the ECU 28. Subsequently, the flow proceeds to Step 218, where the performance times counter Ncat for the catalyst deterioration diagnosis is incremented, after which the program is terminated.

On the contrary, when the average delay time TD1av is judged as being equal to or longer than the deterioration judging value KTD1 in Step 211, the absence of deterioration (normality) in the catalyst 23 is judged, and the flow proceeds to Step 218, where the performance times counter Ncat for the catalyst deterioration diagnosis is incremented, after which the program is terminated.

On the other hand, when the performance condition for the catalyst deterioration diagnosis during idling or low load driving is established while the performance frequency fcat of the catalyst deterioration diagnosis has not reached the required level and the flow thereby proceeds to Step 213 in FIG. 5 from Step 212 in FIG. 4, the catalyst deterioration diagnosis during idling or low load driving is performed as follows. That is, in Step 213, the inverting cycle of the air-fuel ratio F/B correction coefficient FAF is extended by changing a delay constant for the air-fuel ratio F/B control. In this case, an increase (extension) in the inverting cycle of the air-fuel ratio F/B correction coefficient FAF for the catalyst deterioration diagnosis during idling or low load driving is set to a value greater than the increase in the inverting cycle of the air-fuel ratio F/B correction coefficient FAF for the catalyst deterioration diagnosis during medium to high load driving described above.

Subsequently, the flow proceeds to Step 214, where the processing for measuring a delay time TD2 since the air-fuel ratio F/B correction coefficient FAF is inverted until the output from the downstream sensor 25 inverts is repeated a certain number of times (for example, ten times). Then, the flow proceeds to Step 215, where an average delay time TD2av of these measured delay times TD2 is calculated.

Subsequently, the flow proceeds to Step 216, where whether the average delay time TD2av is shorter than a certain deterioration judging value KTD2 is judged. In this case, the deterioration judging value KTD2 to be compared with the average delay time TD2av for the catalyst deterioration diagnosis during idling or low load driving is set to a time longer than the deterioration judging value KTD1 to be compared with the average delay time TD1av for the catalyst deterioration diagnosis during medium to high load driving described above.

In Step 216, when the average delay time TD2av is judged as being shorter than the deterioration judging value KTD2, the flow proceeds to Step 217. Then, the presence of deterioration (abnormality) in the catalyst 23 is judged, and the warning lamp is lit to warn the driver while an abnormality code representing the catalyst deterioration is stored into the back-up RAM in the ECU 28. Subsequently, the flow proceeds to Step 218, where the performance times counter Ncat for the catalyst deterioration diagnosis is incremented, after which the program is terminated.

On the contrary, when the average delay time TD2av is judged as being equal to or longer than the deterioration judging value KTD2 in Step 216, the absence of deterioration (normality) in the catalyst 23 is judged, and the flow proceeds to Step 218, where the performance times counter Ncat for the catalyst deterioration diagnosis is incremented, after which the program is terminated.

According to the processing as above, when the performance frequency fcat of the catalyst deterioration diagnosis has reached the required level, only the catalyst deterioration diagnosis during medium to high load driving is performed so as not to adversely affect exhaust emission. On the other hand, when the performance frequency fcat of the catalyst deterioration diagnosis has not reached the required level, emphasis is placed upon an increase of the performance frequency fcat of the catalyst deterioration diagnosis. Hence, both the catalyst deterioration diagnosis during medium to high load driving and the catalyst deterioration diagnosis during idling or low load driving are performed, and the performance frequency fcat of the catalyst deterioration diagnosis is thus increased. Consequently, the performance frequency fcat of the catalyst deterioration diagnosis can be maintained at or above the required level under the condition that the conventional catalyst deterioration diagnosing method fails to ensure the performance frequency fcat of the catalyst deterioration diagnosis sufficiently. Hence, deterioration in the catalyst 23 can be detected at an early stage. Meanwhile, if the performance frequency fcat of the catalyst deterioration diagnosis is placed under control by regulation in the future, it is possible to increase the performance frequency fcat of the catalyst deterioration diagnosis to reach the level required by regulation.

In the present embodiment, it is configured in such a manner that the catalyst deterioration diagnosis during medium to high load driving is performed when the performance frequency fcat of the catalyst deterioration diagnosis has reached the required level, and both the catalyst deterioration diagnosis during medium to high load driving and the catalyst deterioration diagnosis during idling or low load driving are performed when the performance frequency fcat of the catalyst deterioration diagnosis has not reached the required level. However, the performance frequency fcat of the catalyst deterioration diagnosis may be ensured by changing (easing) the performance condition for the catalyst deterioration diagnosis, establishment of which is judged in Steps 201 through 207 in FIG. 4, according to the performance frequency fcat of the catalyst deterioration diagnosis. The diagnosing method or the judging condition may be changed in association with a change in the performance condition. Alternatively, the diagnosing method or the judging condition may be changed according to the performance frequency fcat of the catalyst deterioration diagnosis.

[Evaporative Gas Leakage Diagnosis]

Figure 7:
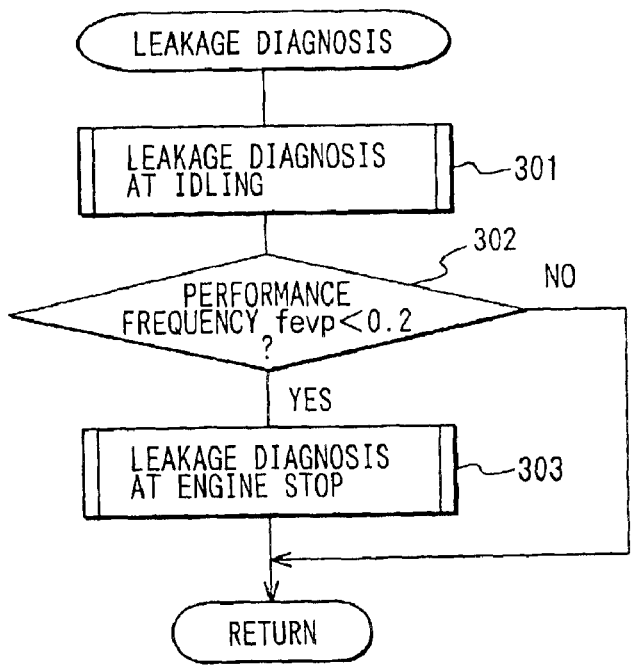
FIG. 7 is a flowchart showing the flow of processing by a program for leakage diagnosis.
Figure 8:
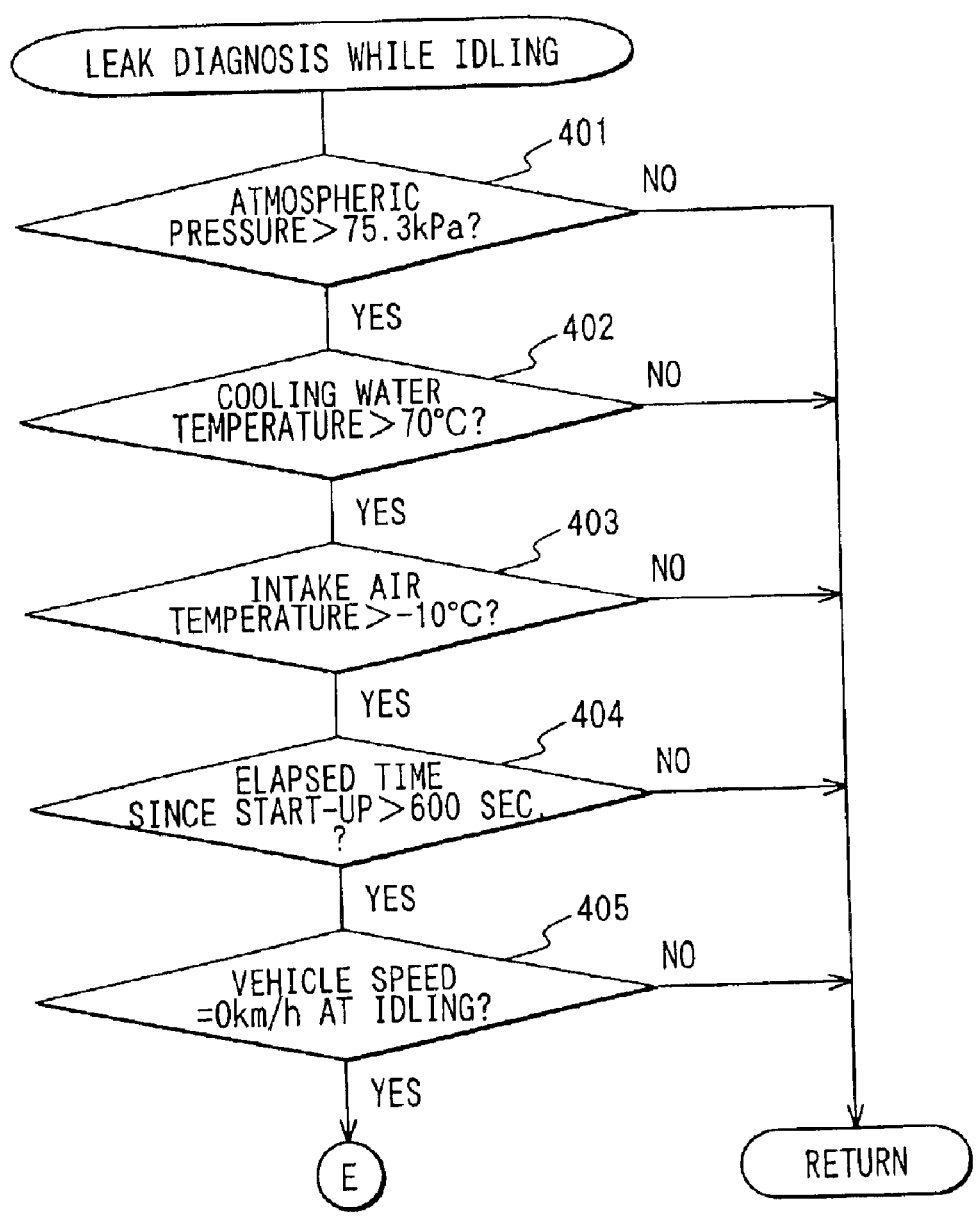
FIG. 8 is a flowchart (#1) detailing the flow of processing by a program for leakage diagnosis during idling.

The program for the leakage diagnosis detailed in FIG. 7 is run repetitively at regular intervals (for example, every 20 msec.) while the power of the ECU 28 stays ON, and the leakage diagnosing processing for the evaporative gas purge system 37 is performed as follows. That is, when this program is initiated, a program for a leakage diagnosis during idling, detailed in FIGS. 8 and 9 and to be described below, is run in Step 301 to diagnose the presence or absence of leakage in the evaporative gas purge system 37 during idling.

In subsequent Step 302, judgment is made as to whether the performance frequency fevp of the leakage diagnosis is calculated by the aforementioned program for performance frequency calculation detailed in FIGS. 2 and 3 is below the required level (for example, 0.2). When the performance frequency fevp of the leakage diagnosis is judged as having not reached the required level, the need to increase the performance frequency fevp of the leakage diagnosis is judged, and the flow proceeds to Step 303 to run a program for a leakage diagnosis during the engine stop detailed in FIGS. 10 and 11 to be described below. Thus, the presence or absence of leakage in the evaporative gas purge system 37 is also diagnosed while the engine is stopped.

On the contrary, when the performance frequency fevp of the leakage diagnosis is judged as having reached the required level in Step 302, the program is terminated without performing the leakage diagnosis during the engine stop. On the other hand, the program for the leakage diagnosis during idling detailed in FIGS. 8 and 9 and initiated in Step 301 is run repetitively at regular intervals (for example, every 20 msec.). When this program is initiated, whether the performance condition for the leakage diagnosis during idling is established or not is judged first in Steps 401 through 405. Here, the performance condition for the leakage diagnosis during idling is established when all the following conditions (1) through (5) are satisfied.

(1) The atmospheric pressure is higher than a certain pressure (for example, 75.3 kPa), that is, the vehicle is not running at a high altitude (Step 401).

(2) The temperature of cooling water is higher than a certain temperature (for example, 70° C.) (Step 402).

(3) The temperature of intake air is higher than a certain temperature (for example, −10° C.) (Step 403).

(4) An elapsed time since the start-up is longer than a certain time (for example, 600 sec.) (Step 404).

(5) The vehicle is not moving (vehicle speed=0 km/h) during idling (Step 405).

When the leakage diagnosis is performed by measuring the tank internal pressure while the vehicle is running, the leakage diagnosis may become less accurate due to the influence of fuel jostling, a non-level fuel level in the fuel tank 38, or a change in the atmospheric pressure. Also, when the leakage diagnosis is performed while the engine is stopped, there arises a problem of battery depletion. This is the reason why the condition (5), that is, the vehicle is not moving (vehicle speed=0 km/h) during idling, is provided as one of the conditions that needs to be satisfied to establish the performance condition for the leakage diagnosis. Consequently, not only can the accuracy of the leakage diagnosis be ensured, but also the performance frequency of the leakage diagnosis can be ensured while avoiding the problem of battery depletion.

When all the conditions (1) through (5) are satisfied, the performance condition for the leakage diagnosis during idling is established. However, when any of the conditions (1) through (5) is not satisfied, the performance condition for the leakage diagnosis during idling fails to be established, and the program is terminated without performing the succeeding processing for the leakage diagnosis during idling (Steps 406 through 415 in FIG. 9).

Figure 9:
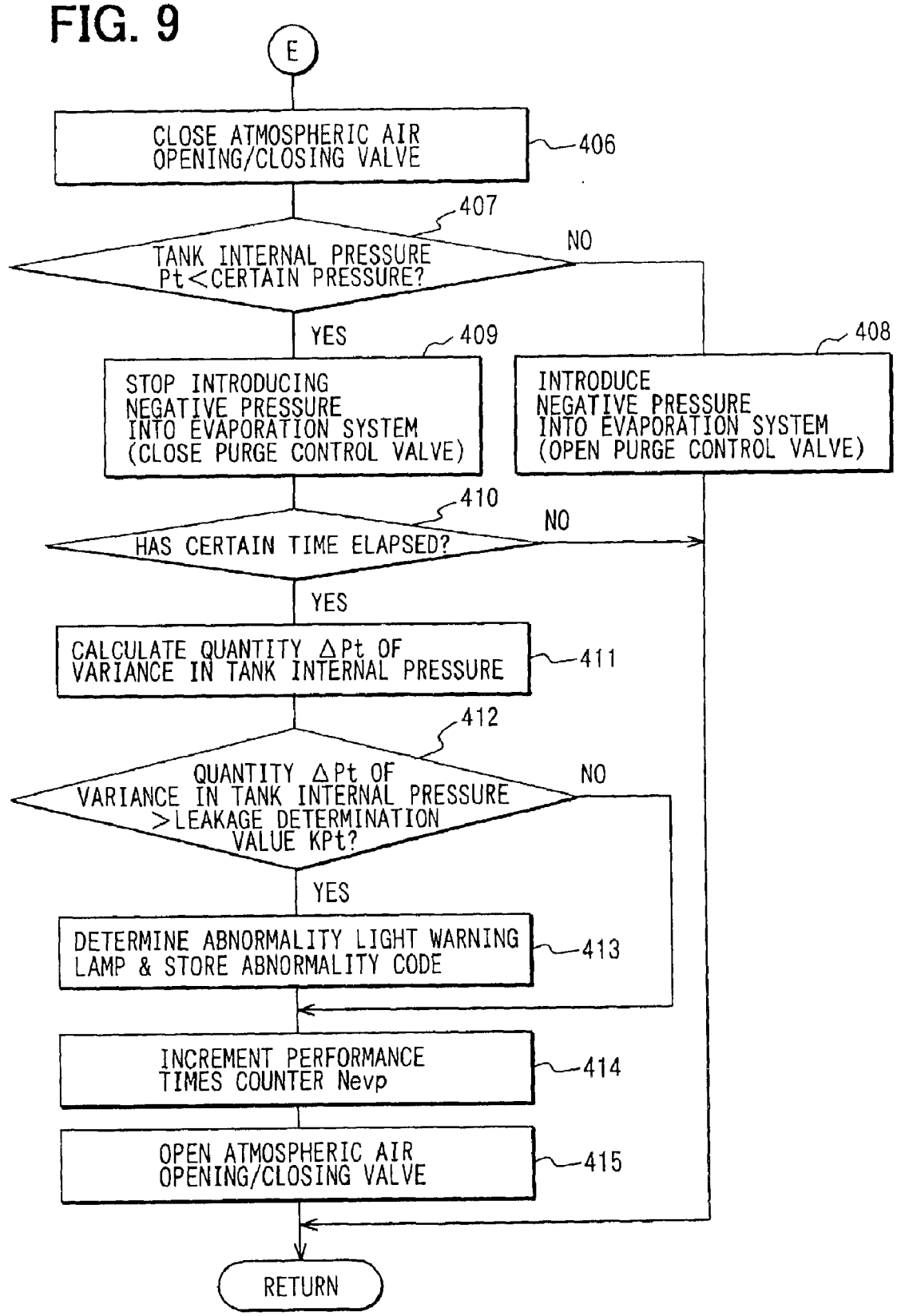
FIG. 9 is a flowchart (#2) detailing the flow of processing by the program for the leakage diagnosis during idling.

On the other hand, when the performance condition for the leakage diagnosis during idling is established, the processing for the leakage diagnosis during idling after Step 406 in FIG. 9 is performed as follows. That is, the atmospheric air opening and closing valve 41 is closed in Step 406. Then, the flow proceeds to Step 407, where whether the tank internal pressure Pt detected by the tank internal pressure sensor 44 is lower than a certain pressure set below the atmospheric pressure. When the tank internal pressure Pt is equal to or higher than the certain pressure, the flow proceeds to Step 408, where the purge control valve 43 is opened. Since the internal pressure of the intake pipe 12 is negative (a pressure lower than the atmospheric pressure) during idling, when the purge control valve 43 is opened, a negative pressure is introduced into the evaporation system (see FIG. 12).

Subsequently, when the tank internal pressure Pt is judged as having dropped below the certain pressure in Step 407, the flow proceeds to Step 409, where the purge control valve 43 is closed to stop introduction of the negative pressure into the evaporation system. The evaporation system is thus sealed in an airtight fashion.

Figure 12:
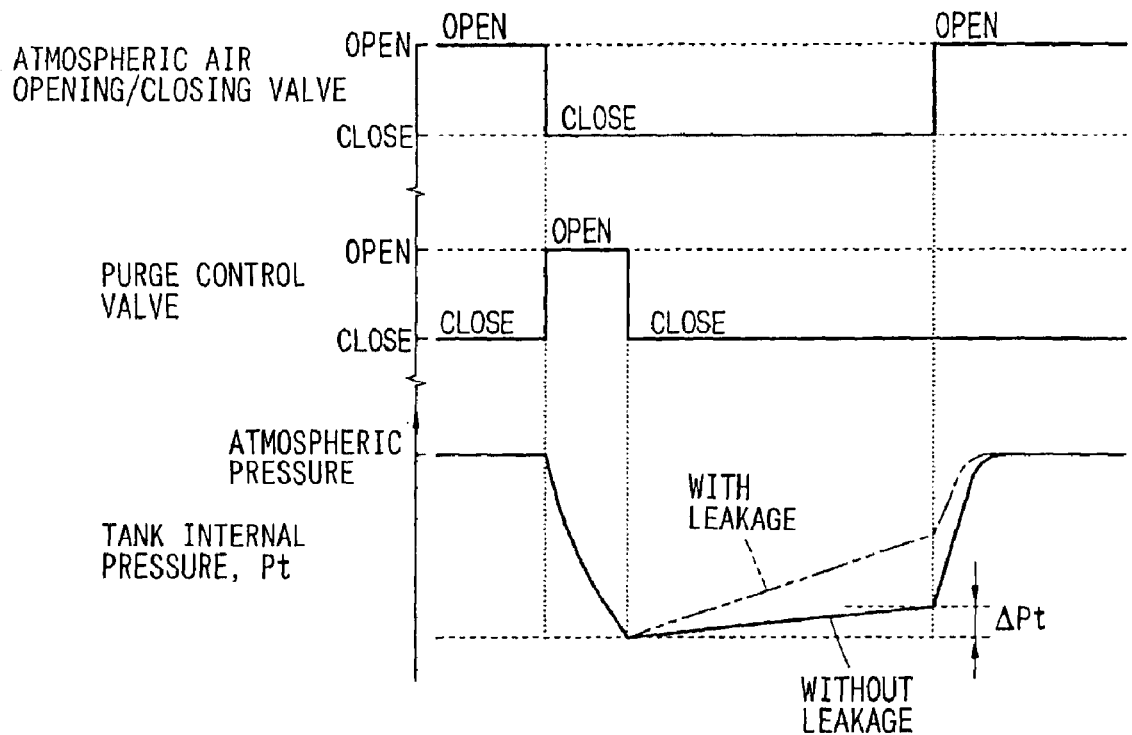
FIG. 12 is a time chart showing an example when performing the leakage diagnosis during engine idling.

As shown in FIG. 12, when the evaporation system is sealed in an airtight fashion after the negative pressure is introduced therein, the tank internal pressure Pt starts to rise gradually for an evaporation gas being generated in the absence of leakage. On the other hand, in the presence of leakage, the atmospheric air is taken into the evaporation system through the leakage hole even when the evaporation system is sealed in an airtight fashion, and an increase in the tank internal pressure Pt occurs. Hence, the presence or absence of leakage can be judged depending on the magnitude of the increase in the tank internal pressure Pt.

The flow proceeds to Step 410 after the evaporation system is sealed, and whether a certain time (for example, 20 sec.) has elapsed since the evaporation system was sealed is determined. The flow proceeds to Step 411 when the certain time has elapsed, and a quantity $\Delta Pt$ of variance in the tank internal pressure since the evaporation system was sealed until the certain time has elapsed is calculated by subtracting a tank internal pressure $Pt1$ immediately after the evaporation system was sealed from a tank internal pressure $Pt2$ after the certain time has elapsed since the evaporation system was sealed.

$$\Delta Pt = Pt2 - Pt1$$

Subsequently, the flow proceeds to Step 412, where whether the quantity $\Delta Pt$ of variance in the tank internal pressure is greater than a certain leakage judging value KPt is determined. The leakage judging value KPt is set depending on a quantity of fuel currently remaining in the fuel tank 38 through the use of a map or an equation.

When the quantity $\Delta Pt$ of variance in the tank internal pressure is judged as being greater than the leakage judging value KPt, the flow proceeds to Step 413. Then, the presence of leakage (abnormality) in the evaporation system is judged, and the warning lamp is lit to warn the driver while an abnormality code representing the presence of leakage is stored into the back-up RAM in the ECU 28. Subsequently, the flow proceeds to Step 414, where the performance times counter Nevp for the leakage diagnosis is incremented. The atmospheric air opening and closing valve 41 is opened in subsequent Step 415, after which the program is terminated.

On the contrary, when the quantity $\Delta Pt$ of variance in the tank internal pressure is judged as being equal to or smaller than the leakage judging value KPt in Step 412, the absence of leakage (normality) in the evaporation system is determined. Then, the flow skips Step 413, and the performance times counter Nevp for the leakage diagnosis is incremented and the atmospheric air opening and closing valve 41 is opened (Steps 414 and 415), after which the program is terminated.

Figure 10:
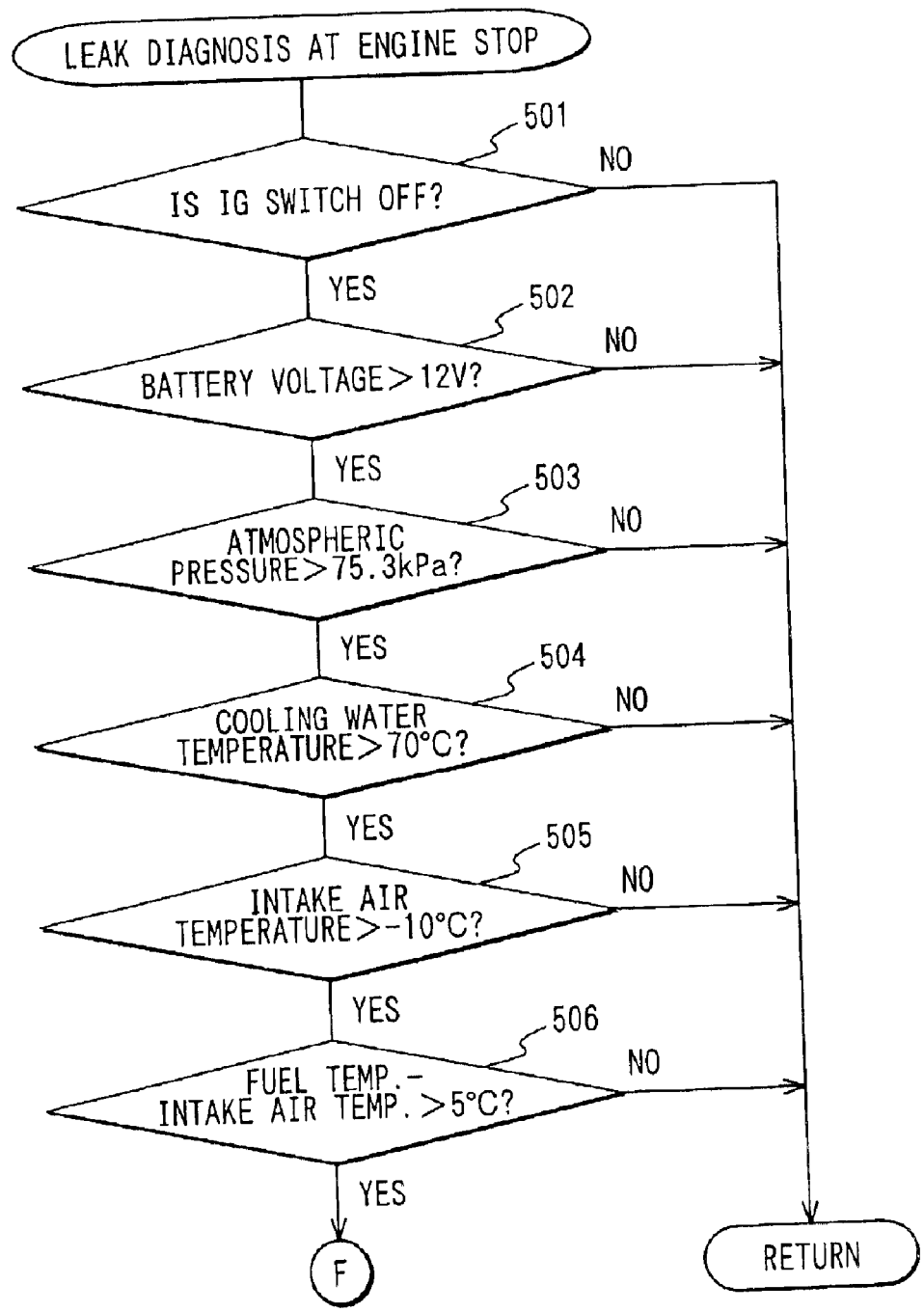
FIG. 10 is a flowchart (#1) detailing the flow of processing by a program for a leakage diagnosis at engine stop.
Figure 11:
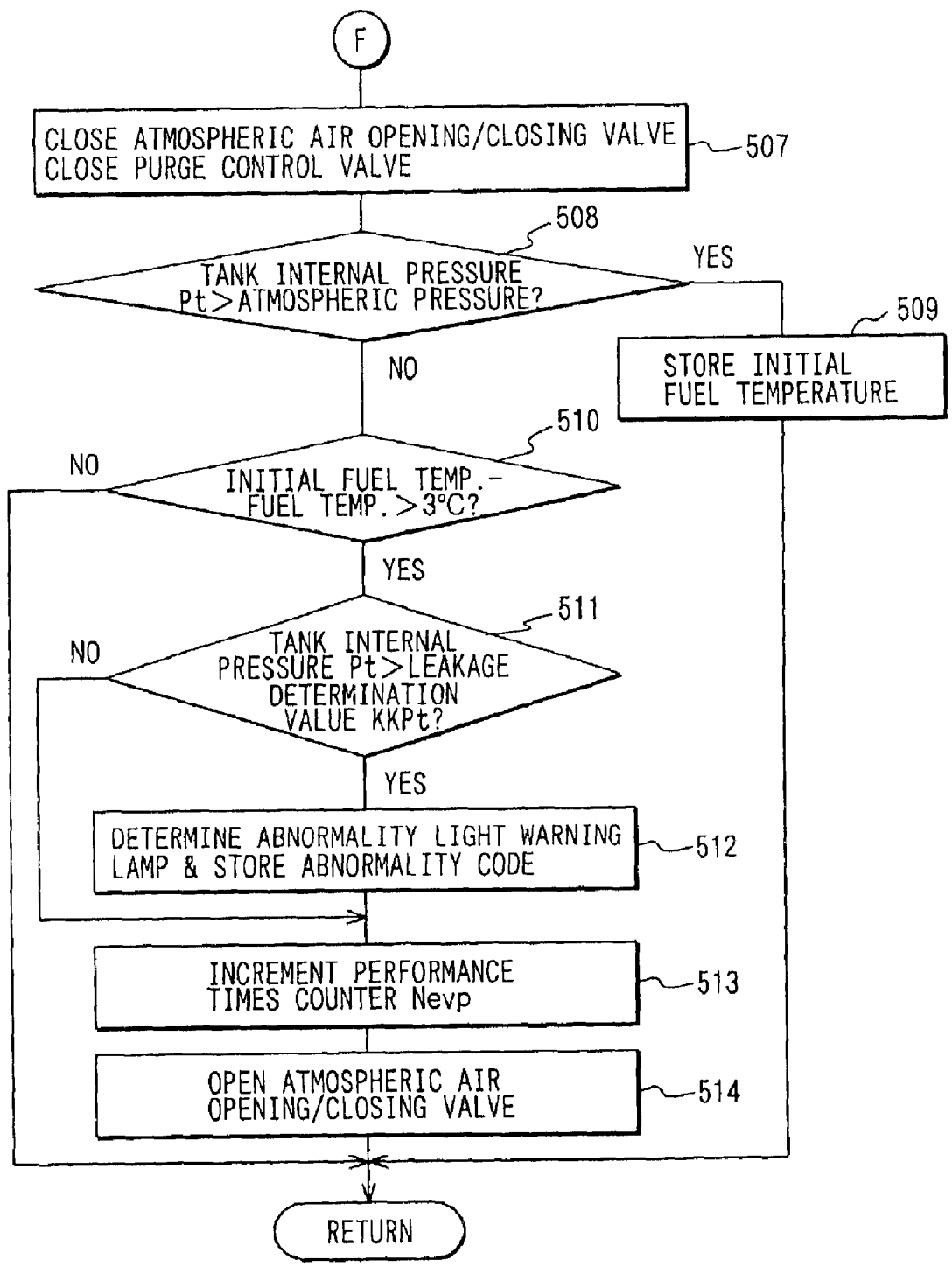
FIG. 11 is a flowchart (#2) detailing the flow of processing by the program for the leakage diagnosis at engine stop.

On the other hand, the program for the leakage diagnosis at the engine stop (Step 303 in FIG. 7) detailed in FIGS. 10 and 11 is run repetitively at regular intervals (for example, every 20 msec.) when the performance frequency fevp of the leakage diagnosis is lower than the certain value. When this program is initiated, whether the performance condition for the leakage diagnosis at the engine stop is established or not is judged first in Steps 501 through 506. Here, the performance condition for the leakage diagnosis at the engine stop is established when all the following conditions (1) through (6) are satisfied.

(1) The ignition switch (hereinafter, referred to as the IG switch) is turned OFF, that is, the engine has been stopped (Step 501).

(2) The voltage of the battery is higher than a certain voltage (for example, 12V) (Step 502).

(3) The atmospheric pressure is higher than a certain pressure (for example, 75.3 kPa), that is, the vehicle is not running at a high altitude (Step 503).

(4) The temperature of cooling water is higher than a certain temperature (for example, 70° C.) when the IG switch is turned OFF (Step 504).

(5) The temperature of intake air is higher than a certain temperature (for example, −10° C.) when the IG switch is turned OFF (Step 505).

(6) The difference between the fuel temperature and the intake air temperature when the IG switch is turned OFF is greater than a certain temperature (for example, 5° C.) (Step 506).

When all the conditions (1) through (6) are satisfied, the performance condition for the leakage diagnosis at the engine stop is established. However, when any of the conditions (1) through (6) is not satisfied, the performance condition for the leakage diagnosis at the engine stop fails to be established, and the program is terminated without performing the succeeding processing for the leakage diagnosis at the engine stop (Steps 507 through 514 in FIG. 10).

On the other hand, when the performance condition for the leakage diagnosis at the engine stop is established, the processing for the leakage diagnosis at the engine stop after step 507 in FIG. 10 is performed as follows. That is, in Step 507, the atmospheric air opening and closing valve 41 is closed while the purge control valve 43 is also closed. The evaporation system is thus sealed airtight.

Figure 13:
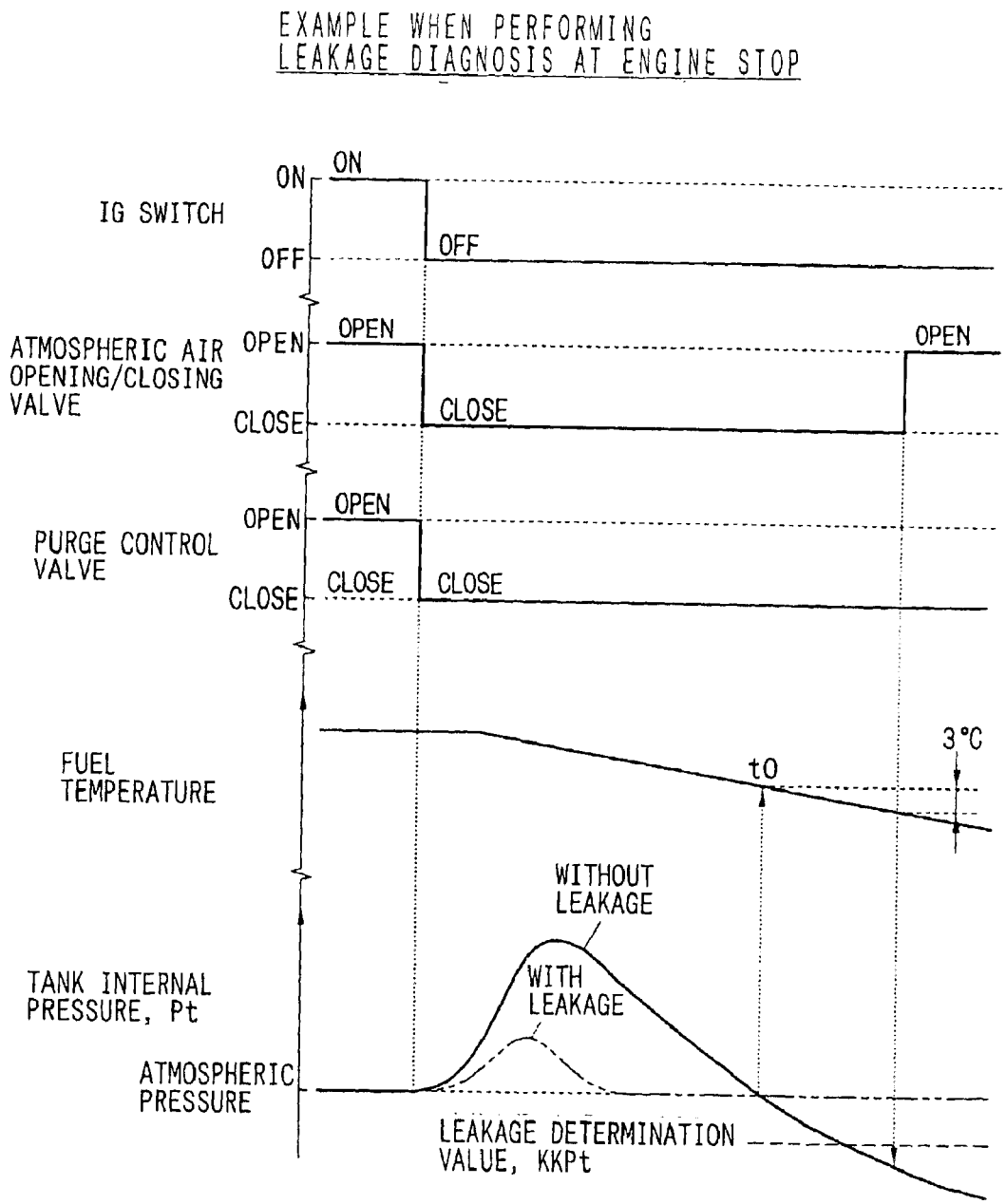
FIG. 13 is a time chart showing an example when performing the leakage diagnosis during engine idling.

As shown in FIG. 13, the fuel temperature in the fuel tank 38 is high immediately after the engine is stopped, and a large quantity of evaporative gas is generated. Hence, when the evaporation system is sealed in an airtight fashion immediately after the engine is stopped, the tank internal pressure Pt rises due to the evaporative gas that is generated and accumulated in the absence of venting. Later, the fuel temperature decreases as the fuel tank 38 is cooled by outside air and the evaporative gas inside the fuel tank 38 begins to condense (turns to liquid). The pressure in the evaporation system then starts to drop to a negative pressure (a pressure lower than the atmospheric pressure) with time. On the other hand, in the presence of leakage, even when the evaporation system is sealed, the evaporative gas leaks into the atmospheric air through the leakage hole in the evaporation system or the atmospheric air is taken into the evaporation system through the leakage hole when the internal pressure is negative. Hence, after the evaporation system is sealed airtight, the tank internal pressure Pt converges near the atmospheric pressure in a relatively short time without rising to a positive pressure or dropping to a negative pressure considerably away from the atmospheric pressure.

After the evaporation system is sealed airtight, the flow proceeds to Step 508, where whether the tank internal pressure Pt is higher than the atmospheric pressure is determined. When the tank internal pressure Pt is higher than the atmospheric pressure, the flow proceeds to Step 509 to repeat the processing to update the initial fuel temperature by storing the current fuel temperature until the tank internal pressure Pt drops to or below the atmospheric pressure.

Subsequently, when the tank internal pressure Pt is determined to have dropped to or below the atmospheric pressure in Step 508, the flow proceeds to Step 510. In Step 510, judgment is made as to whether the difference between the initial fuel temperature t0 (the fuel temperature at which the tank internal pressure Pt=atmospheric pressure) and the current fuel temperature is greater than a certain temperature (for example, 3° C.), that is, whether a decrease of the fuel temperature from the initial fuel temperature t0 has exceeded the certain temperature.

Then, the flow proceeds to Step 511 when the decrease of the fuel temperature from the initial temperature t0 has exceeded the certain temperature. It is determined if the tank internal pressure Pt is higher than a certain leakage judging value KKPt. The leakage judging value KKPt is set depending on a quantity of fuel currently remaining in the fuel tank 38 through the use of a map or an equation.

When the tank internal pressure Pt is judged as being higher than the leakage judging value KKPt in Step 511, the flow proceeds to Step 512. Then, the presence of leakage (abnormality) in the evaporation system is judged, and the warning lamp is lit to warn the driver while an abnormality code representing the presence of leakage is stored in the back-up RAM in the ECU 28. Subsequently, the flow proceeds to Step 513, where the performance times counter Nevp for the leakage diagnosis is incremented. The atmospheric air opening and closing valve 41 is opened in subsequent Step 514, after which the program is terminated.

On the contrary, when the tank internal pressure Pt is judged as being equal to or lower than the leakage judging value KKPt in Step 511, the absence of leakage (normality) in the evaporation system is determined, and the flow proceeds to Step 513, where the performance times counter Nevp for the leakage diagnosis is incremented. The atmospheric air opening and closing valve 41 is opened in subsequent Step 514, after which the program is terminated.

According to the processing as above, only the leakage diagnosis during idling is performed when the performance frequency fevp of the leakage diagnosis has reached the required level, which not only ensures the accuracy of the leakage diagnosis, but also prevents the problem of battery depletion. On the other hand, when the performance frequency fevp of the leakage diagnosis has not reached the required level, emphasis is placed upon an increase of the performance frequency fevp of the leakage diagnosis, and both the leakage diagnosis during idling and the leakage diagnosis at engine stop are performed. The performance frequency fevp of the leakage diagnosis is thus increased.

Consequently, the performance frequency fevp of the leakage diagnosis can be maintained at or above the required level under the condition that the conventional leakage diagnosing method fails to sufficiently ensure the performance frequency fevp of the leakage diagnosis. Hence, should leakage occur in the evaporative gas purge system 37, the leakage can be detected at an early stage. Meanwhile, if the performance frequency fevp of the leakage diagnosis is placed under control by regulation in the future, it is possible to increase the performance frequency fevp of the leakage diagnosis to reach the level required by regulation.

In the present embodiment, it is configured in such a manner that only the leakage diagnosis during idling is performed when the performance frequency fevp of the leakage diagnosis has reached the required level, and both the leakage diagnosis during idling and the leakage diagnosis at engine stop are performed when the performance frequency fevp of the leakage diagnosis has not reached the required level. However, the performance frequency fevp of the leakage diagnosis may be ensured by changing (easing) the performance condition for the leakage diagnosis, establishment of which is judged in Steps 401 through 405 in FIG. 8 (or Steps 501 through 506 in FIG. 10), according to the performance frequency fevp of the leakage diagnosis. The diagnosing method or the judging condition may be changed in association with a change in the performance condition.

Alternatively, the performance frequency fevp of the leakage diagnosis may be ensured by changing the diagnosing method or the judging condition according to the performance frequency fevp of the leakage diagnosis. To be more specific, there is a characteristic that the longer the performance time of the leakage diagnosis (the time for measuring the quantity $\Delta Pt$ of variance in the tank internal pressure after the evaporation system becomes airtight), the more the frequency (the frequency that the leakage diagnosis is aborted before it is completed) is increased in failing to establish the performance condition for the leakage diagnosis during the leakage diagnosis. Therefore, the performance frequency fevp of the leakage diagnosis decreases. Thus, when the performance frequency fevp of the leakage diagnosis has not reached the required level, the performance time of the leakage diagnosis (the time for measuring the quantity $\Delta Pt$ of variance in the tank internal pressure after the evaporation system becomes airtight) may be shortened. A smaller value may be assigned to the leakage judging value KPt in response to the quantity $\Delta Pt$ of variance in the tank internal pressure that decreases as the performance time is shortened. As has been described, when the performance time for the leakage diagnosis is shortened, the frequency that the condition for the leakage diagnosis fails to be established during the leakage diagnosis is reduced, and therefore, the performance frequency fevp of the leakage diagnosis can be increased.

Also, the leakage diagnosis while the engine is operating may be performed under relatively stable operating conditions other than idling, for example, during maintained driving. For instance, when the performance frequency fevp of the leakage diagnosis has reached the required level, only the leakage diagnosis during driving may be performed, and when the performance frequency fevp of the leakage diagnosis has not reached the required level, both the leakage diagnosis during driving and the leakage diagnosis at engine stop may be performed.

Alternatively, when the performance frequency fevp of the leakage diagnosis has reached the required level, only the leakage diagnosis during idling may be performed, and when the performance frequency fevp of the leakage diagnosis has not reached the required level, both the leakage diagnosis during idling and the leakage diagnosis at driving may be performed.

Furthermore, when the performance frequency fevp of the leakage diagnosis has not reached the required level, the leakage diagnosis during idling, the leakage diagnosis during driving, and the leakage diagnosis at engine stop may all be performed. It is needless to say that a combination of the diagnosing methods to be performed among the foregoing three diagnosing methods can be changed according to the performance frequency fevp of the leakage diagnosis.

[EGR Abnormality Diagnosis]

Figure 14:
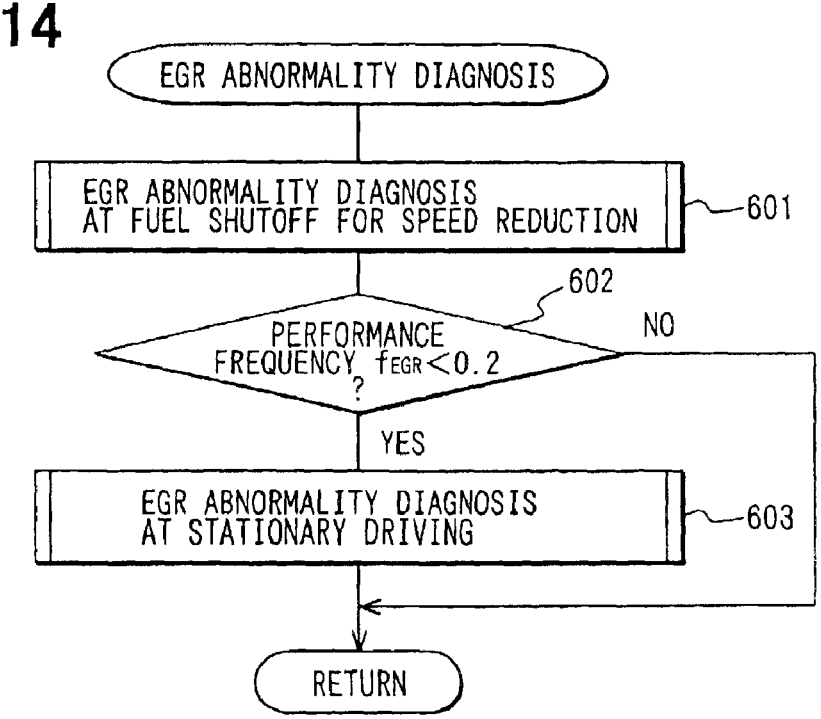
FIG. 14 is a flowchart detailing the flow of processing by a program for an EGR abnormality diagnosis.

The program for the EGR abnormality diagnosis detailed in FIG. 14 is run repetitively at regular intervals (for example, every 10 msec.) after the IG switch is turned ON, and the presence or absence of an abnormality in the EGR system 29 is determined as follows. That is, when this program is initiated, a program for an EGR abnormality diagnosis at fuel shutoff for speed reduction detailed in FIGS. 15 and 16 to be described below is run in Step 601 to diagnose the presence or absence in the EGR system 29 at fuel shutoff for reducing speed.

Then, the flow proceeds to Step 602, where judgment is made as to whether the performance frequency fEGR of the EGR abnormality diagnosis calculated by the aforementioned program for performance frequency calculation detailed in FIGS. 2 and 3 is below the required level (for example, 0.2). When the performance frequency fEGR of the EGR abnormality diagnosis is judged as having not reached the required level, the need to increase the performance frequency fEGR of the EGR abnormality diagnosis is judged and the flow proceeds to Step 603. Then, a program for an EGR abnormality diagnosis during stationary driving detailed in FIGS. 17 and 18 to be described below is run, and therefore, the presence or absence of an abnormality in the EGR system 29 is also diagnosed during consistent, maintained driving.

Figure 15:
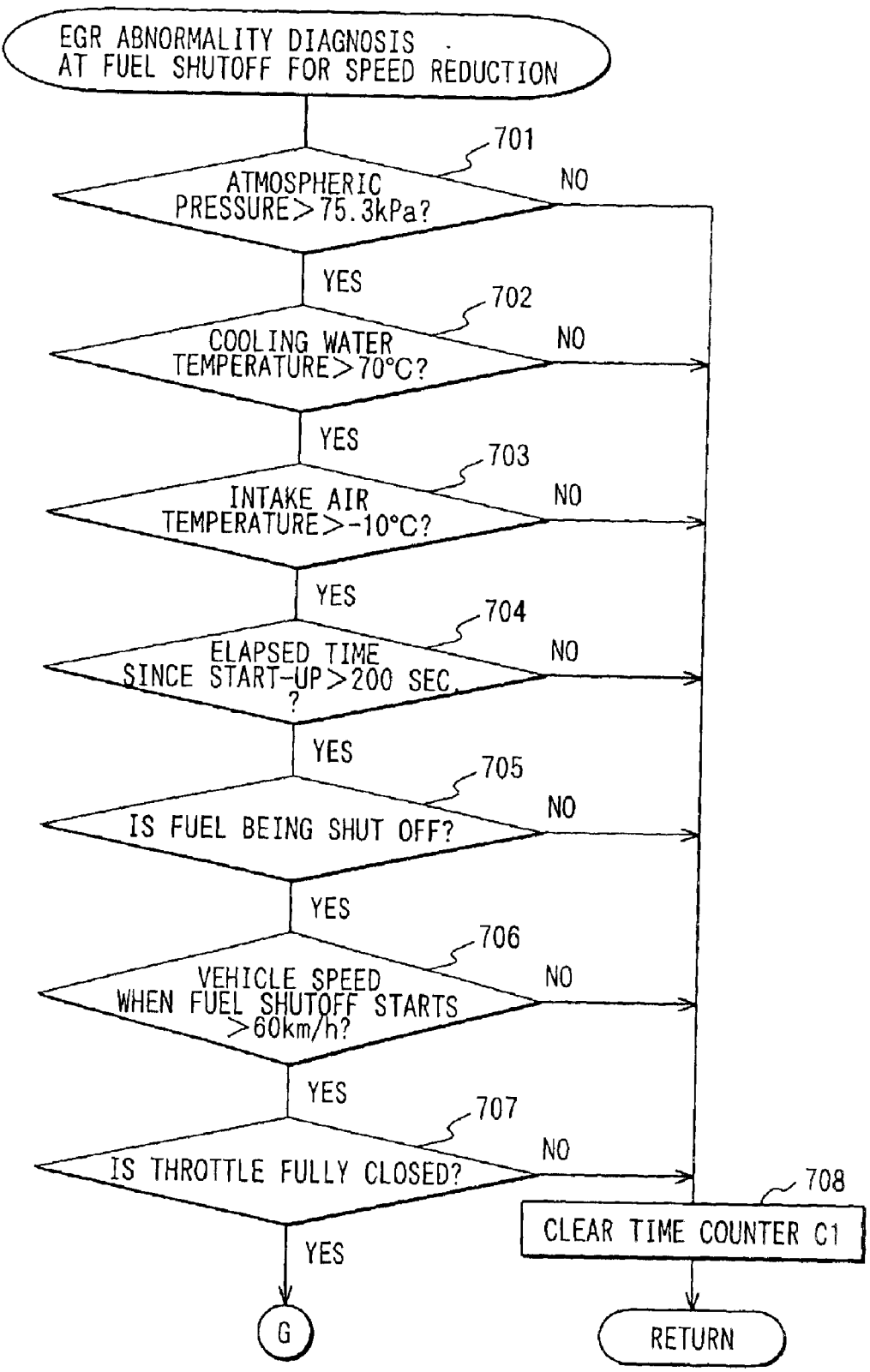
FIG. 15 is a flowchart (#1) detailing the flow of processing by a program for an EGR abnormality diagnosis during fuel shutoff for speed reduction.
Figure 16:
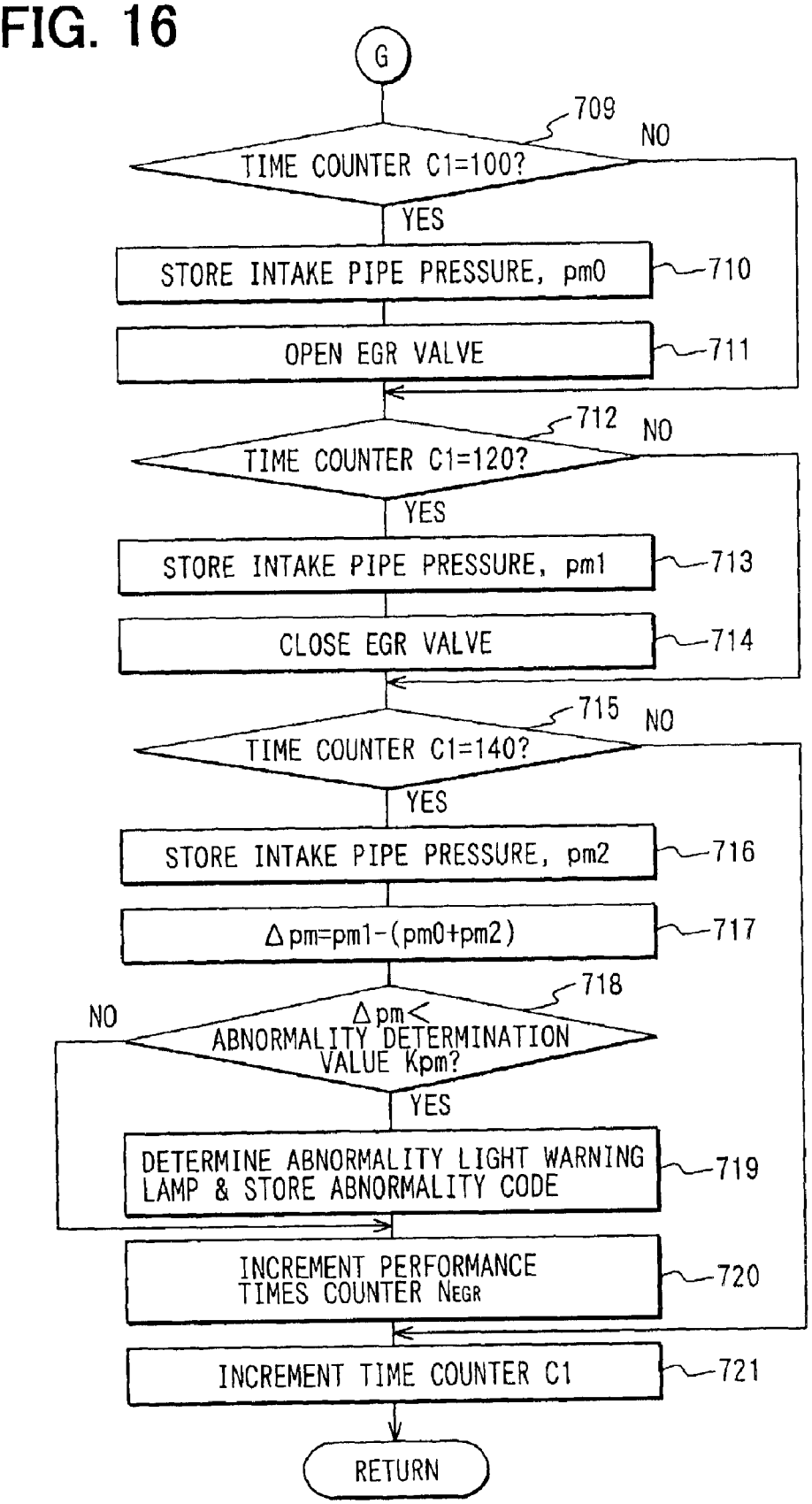
FIG. 16 is a flowchart (#2) detailing the flow of processing by the program for the EGR abnormality diagnosis during fuel shutoff for speed reduction.

On the contrary, when the performance frequency fEGR of the EGR abnormality diagnosis is judged as having reached the required level in Step 602, the program is terminated without performing the EGR abnormality diagnosis during maintained driving. On the other hand, when the program for the EGR abnormality diagnosis at fuel shutoff for speed reduction detailed in FIGS. 15 and 16 is initiated in Step 601, whether the performance condition for the EGR abnormality diagnosis at fuel shutoff for speed reduction is established or not is judged first in Steps 701 through 707. Here, the performance condition for the EGR abnormality diagnosis at fuel shutoff for speed reduction is established when all the following conditions (1) through (7) are satisfied.

(1) The atmospheric pressure is higher than a certain pressure (for example, 75.3 kPa), that is, the vehicle is not running at a high altitude (Step 701).

(2) The temperature of cooling water is higher than a certain temperature (for example, 70° C.) (Step 702).

(3) The temperature of intake air is higher than a certain temperature (for example, −10° C.) (Step 703).

(4) An elapsed time since the start-up is longer than a certain time (for example, 200 sec.) (Step 704).

(5) The fuel is being shutoff (Step 705).

(6) The vehicle speed when the fuel shutoff starts is higher than a certain speed (for example, 60 km/h)(Step 706).

(7) The throttle is fully closed (Step 707).

When the EGR abnormality diagnosis is performed and the EGR valve 31 is forcefully opened and closed while the engine is operating under a condition other than fuel shutoff, the EGR quantity becomes inadequate for the engine to operate. This may possibly impair the drivability or exhaust emission of the vehicle. This is the reason why conditions (5) through (7), that is, being in the fuel shutoff for speed reduction state, are provided as the conditions that need to be satisfied to establish the performance condition for the EGR abnormality diagnosis. Consequently, the EGR abnormality diagnosis can be performed without adversely affecting the drivability and exhaust emission.

When all the foregoing conditions (1) through (7) are satisfied, the performance condition for the EGR abnormality diagnosis at fuel shutoff for speed reduction is established. However, when any of the foregoing conditions (1) through (7) is not satisfied, the performance condition for the EGR abnormality diagnosis at fuel shutoff for speed reduction fails to be established. Thus, the flow proceeds to Step 708, where a time counter C1 is cleared, after which the program is terminated without performing the succeeding processing for the EGR abnormality diagnosis at fuel shutoff for speed reduction (Steps 709 through 721 in FIG. 16).

On the other hand, when the performance condition for the EGR abnormality diagnosis at fuel shutoff for speed reduction is established, the processing for the EGR abnormality diagnosis at fuel shutoff for speed reduction after Step 709 of FIG. 16 is performed as follows. That is, in Step 709, judgment is made as to whether the value in the time counter C1 that counts an elapsed time since the establishment of the performance condition for the EGR abnormality diagnosis at fuel shutoff for speed reduction has reached, for example, 100 (equivalent to 1 sec.). The value in the time counter C1 is 0 when the performance condition for the EGR abnormality diagnosis at fuel shutoff for speed reduction is established. Hence, the flow proceeds to Step 709→Step 712→Step 715→Step 721 to repeat the processing to increment the time counter C1 until the time counter C1=100.

Then, the flow proceeds to Step 710 from Step 709 when the value in the time counter C1 has reached 100, and the intake pipe pressure pm0 detected by the intake pipe pressure sensor 18 at that instance is stored. The EGR valve 31 is opened in subsequent Step 711. Since the intake pipe pressure pm is negative (a pressure lower than the atmospheric pressure) at fuel shutoff for speed reduction (when the throttle is fully closed), the intake pipe pressure pm starts to rise (see FIG. 19) when the EGR valve 31 is opened if the EGR system 29 is operating normally.

Then, the flow proceeds to Step 712, where judgment is made as to whether the value in the time counter C1 has reached, for example, 120 (equivalent to 1.2 sec.). While the value in the time counter C1 is smaller than 120, the flow proceeds to Step 712→Step 715→Step 721 to repeat the processing to increment the time counter C1 until the time counter C1=120.

Figure 19:
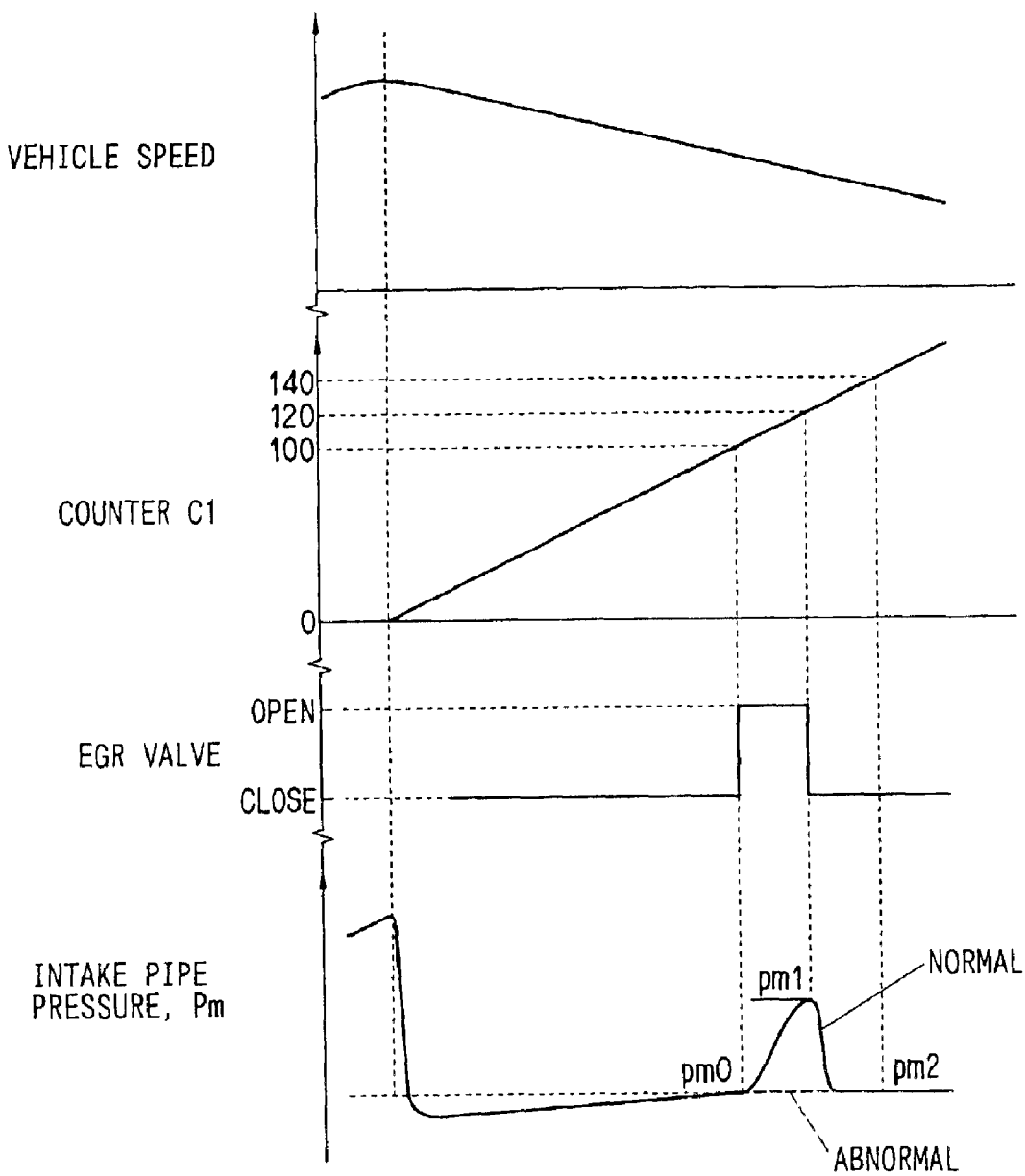
FIG. 19 is a time chart showing an example when performing the EGR abnormality diagnosis at fuel shutoff during speed reduction.

The flow proceeds to Step 713 from Step 712 when the value in the time counter C1 has reached 120, and the intake pipe pressure pm1 detected by the intake pipe pressure sensor 18 at that instance is stored. The EGR valve 31 is closed in subsequent Step 714, whereupon the intake pipe pressure pm drops as shown in FIG. 19 if the EGR system 29 is operating normally.

Then, the flow proceeds to Step 715, where judgment is made as to whether the value in the time counter C1 has reached, for example, 140 (equivalent to 1.4 sec.). While the value in the time counter C1 is smaller than 140, the flow proceeds to Step 715→Step 721 to repeat the processing to increment the time counter C1 until the time counter C1=140.

The flow proceeds to Step 716 from Step 715 when the value in the time counter C1 has reached 140, and the intake pipe pressure pm2 detected by the intake pipe pressure sensor 18 at that instance is stored. In subsequent Step 717, a quantity Δpm of variance in the intake pipe pressure is calculated in accordance with the following Equation:

$$\Delta pm = pm1 - (pm0 + pm2)$$

Then, the flow proceeds to Step 718, where whether the quantity Δpm of variance in the intake pipe pressure is smaller than a certain abnormality judging value Kpm is judged. When the quantity Δpm of variance in the intake pipe pressure is judged as being smaller than the abnormality judging value Kpm, the flow proceeds to Step 719. Then, the abnormality in the EGR system 29 is judged, and the warning lamp is lit to warn the driver while an abnormality code representing the abnormality in the EGR system 29 is stored into the back-up RAM in the ECU 28. Subsequently, the flow proceeds to Step 720, where the performance times counter NEGR for the EGR abnormality diagnosis is incremented.

On the contrary, when the quantity Δpm of variance in the intake pipe pressure is judged as being equal to or greater than the abnormality judging value Kpm in Step 718, the normality in the EGR system 29 is judged. Then, the flow proceeds to Step 720, where the performance times counter NEGR for the EGR abnormality diagnosis is incremented.

Figure 17:
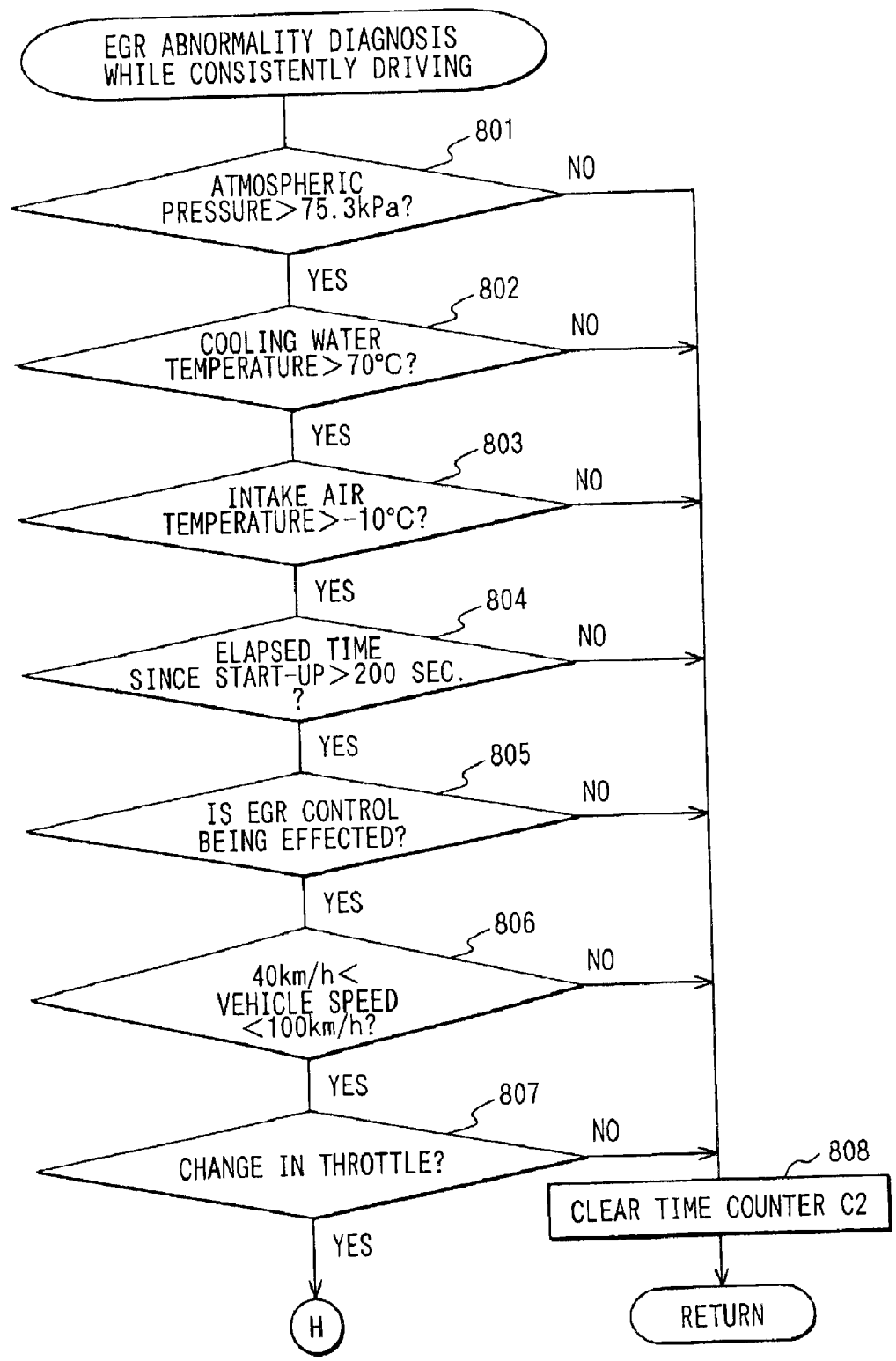
FIG. 17 is a flowchart (#1) detailing the flow of processing by a program for an EGR abnormality diagnosis during stationary driving.
Figure 18:
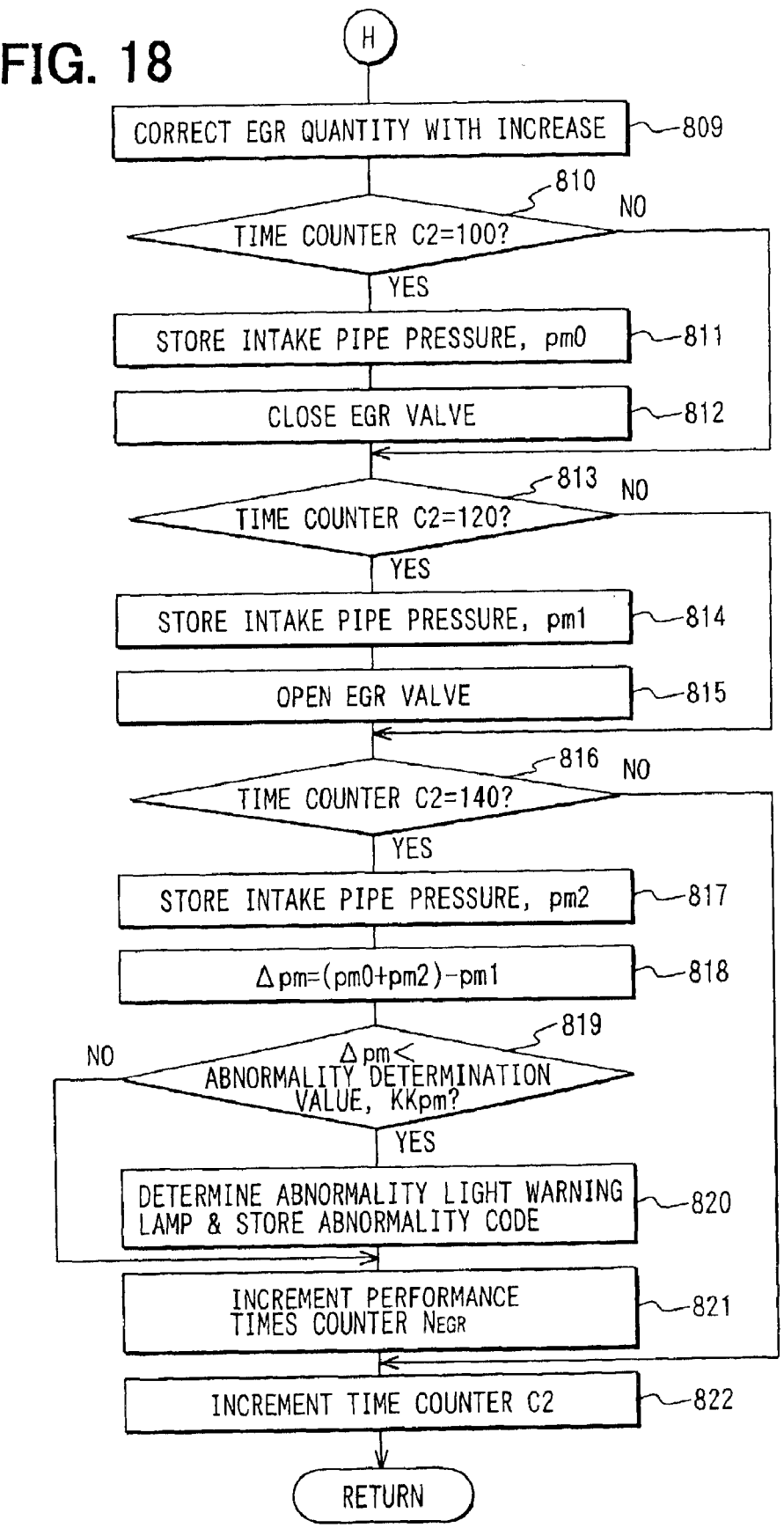
FIG. 18 is a flowchart (#2) detailing the flow of processing by the program for the EGR abnormality diagnosis during stationary driving.

On the other hand, the program for the EGR abnormality diagnosis during consistent, maintained driving, detailed in FIGS. 17 and 18 (Step 603 in FIG. 14), is run repetitively at regular intervals (for example, every 10 msec.) when the performance frequency fEGR of the EGR abnormality diagnosis has not reached the required level. When this program is initiated, whether the performance condition for the EGR abnormality diagnosis during consistent, maintained driving is established or not is judged first in Steps 801 through 807. Here, the performance condition for the EGR abnormality diagnosis during consistent, maintained driving is established when all the following conditions (1) through (7) are satisfied.

(1) The atmospheric pressure is higher than a certain pressure (for example, 75.3 kPa), that is, the vehicle is not running at a high altitude (Step 801).

(2) The temperature of cooling water is higher than a certain temperature (for example, 70° C.) (Step 802).

(3) The temperature of intake air is higher than a certain temperature (for example, −10° C.) (Step 803).

(4) An elapsed time since the start-up is longer than a certain time (for example, 200 sec.) (Step 804).

(5) The EGR control is being effected (Step 805).

(6) The vehicle speed is within a certain speed range (for example, from 40 to 100 km/h) (Step 806).

(7) The throttle opening is nearly constant, that is, the vehicle is experiencing constant, maintained driving (Step 807).

Whether the throttle opening is nearly constant or not is judged by, for example, checking whether a changing rate of the throttle opening is at or below a certain value (for example, 0.2 deg./10 msec.).

When all the foregoing conditions (1) through (7) are satisfied, the performance condition for the EGR abnormality diagnosis during consistent, maintained driving is established. However, when any of the foregoing conditions (1) through (7) is not satisfied, the performance condition for the EGR abnormality diagnosis during consistent, maintained driving fails to be established. Thus, the flow proceeds to Step 808, where a time counter C2 that counts an elapsed time since the establishment of the performance condition for the EGR abnormality diagnosis during consistent, maintained driving is cleared, after which the program is terminated without performing the succeeding processing for the EGR abnormality diagnosing during consistent, maintained driving (Steps 809 through 822 in FIG. 18).

On the other hand, when the performance condition for the EGR abnormality diagnosis during consistent, maintained driving is established, the processing for the EGR abnormality diagnosing during consistent, maintained driving after Step 809 in FIG. 18 is performed as follows. That is, in Step 809, the EGR quantity is corrected with an increase, so that the EGR quantity is increased by a certain quantity (for example, by 10%).

Then, the flow proceeds to Step 810, where judgment is made as to whether the value in the time counter C2 has reached, for example, 100 (equivalent to 1 sec.). Here, the time counter C2=0 when the performance condition for the EGR abnormality diagnosis during consistent, maintained driving is established. Hence, the flow proceeds to Step 810→Step 813→Step 816→Step 822 to repeat the processing to increment the time counter C2 until the time counter C2=100.

The flow proceeds to Step 811 from Step 810 when the value in the time counter C2 has reached 100, and the intake pipe pressure pm0 detected by the intake pipe pressure sensor 18 at that instance is stored. The EGR valve 31 is closed in subsequent Step 812, whereupon the intake pipe pressure pm starts to drop by a decrease in the EGR quantity if the EGR system 29 is operating normally (see FIG. 20).

Then, the flow proceeds to Step 813, where judgment is made as to whether the value in the time counter C2 has reached, for example, 120 (equivalent to 1.2 sec.). While the value in the time counter C2 is smaller than 120, the flow proceeds to Step 813→Step 816→Step 822 to repeat the processing to increment the time counter C2 until the time counter C2=120.

Figure 20:
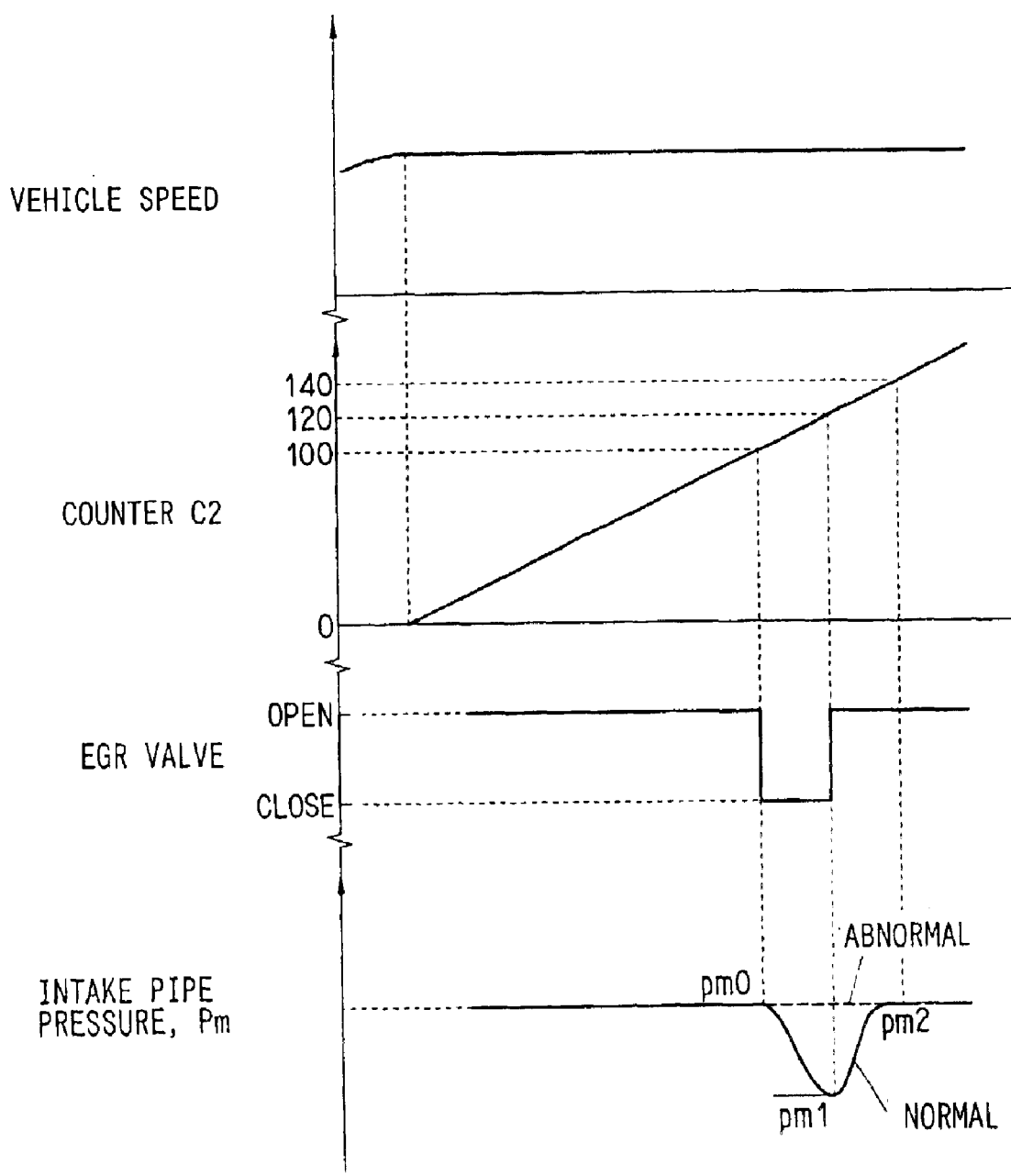
FIG. 20 is a time chart showing an example when performing the EGR abnormality diagnosis during steady driving.

The flow proceeds to Step 814 from Step 813 when the value in the time counter C2 has reached 120, and the intake pipe pressure pm1 detected by the intake pipe pressure sensor 18 at that instance is stored. The EGR valve 31 is opened in subsequent Step 815, whereupon the intake pipe pressure pm starts to rise as shown in FIG. 20 if the EGR system 29 is operating normally.

Then, the flow proceeds to Step 816, where judgment is made as to whether the value in the time counter C2 has reached, for example, 140 (equivalent to 1.4 sec.). While the value in the time counter C2 is smaller than 140, the flow proceeds to Step 816→Step 822 to repeat the processing to increment the time counter C2 until the time counter C2=140.

The flow proceeds to Step 817 from Step 816 when the value in the time counter C2 has reached 140, and the intake pipe pressure pm2 detected by the intake pipe pressure sensor 18 at that instance is stored. A quantity Δpm of variance in the intake pipe pressure is calculated in subsequent Step 817 in accordance with the following Equation:

$$\Delta pm = (pm0 + pm2) - pm1$$

Then, the flow proceeds to Step 819, where whether the quantity Δpm of variance in the intake pipe pressure is smaller than a certain abnormality judging value KKpm is judged. When the quantity Δpm of variance in the intake pipe pressure is judged as being smaller than the abnormality judging value KKpm, the flow proceeds to Step 820. Then, the abnormality in the EGR system 29 is judged, and the warning lamp is lit to warn the driver while an abnormality code representing the abnormality in the EGR system 29 is stored into the back-up RAM in the ECU 28. Subsequently, the flow proceeds to Step 821, where the performance times counter NEGR for the EGR abnormality diagnosis is incremented.

On the contrary, when the quantity Δpm of variance in the intake pipe pressure is judged as being equal to or greater than the abnormality judging value KKpm in Step 819, the normality in the EGR system 29 is judged. Then, the flow proceeds to Step 821, where the performance times counter NEGR for the EGR abnormality diagnosis is incremented.

According to the processing as above, when the performance frequency fEGR of the EGR abnormality diagnosis has reached the required level, only the EGR abnormality diagnosis at fuel shutoff for speed reduction is performed so as not to adversely affect the drivability and exhaust emission. On the other hand, when the performance frequency fEGR of the EGR abnormality diagnosis has not reached the required level, emphasis is placed upon an increase of the performance frequency fEGR of the EGR abnormality diagnosis. Hence, both the EGR abnormality diagnosis at fuel shutoff for speed reduction and the EGR abnormality diagnosis during consistent, maintained driving are performed, and the performance frequency fEGR of the EGR abnormality diagnosis is thus increased. Consequently, the performance frequency fEGR of the EGR abnormality diagnosis can be maintained at or above the required level under the condition that the conventional EGR abnormality diagnosing method fails to ensure the performance frequency fEGR of the EGR abnormality diagnosis sufficiently. Hence, should an, abnormality occur in the EGR system 29, the abnormality can be detected at an early stage. Meanwhile, if the performance frequency fEGR of the EGR abnormality diagnosis is placed under control by regulation in the future, it is possible to increase the performance frequency fEGR of the EGR abnormality diagnosis to reach the level required by regulation.

The present embodiment is configured in such a manner that the EGR abnormality diagnosis at fuel shutoff for speed reduction is performed when the performance frequency fEGR of the EGR abnormality diagnosis has reached the required level, and both the EGR abnormality diagnosis at fuel shutoff for speed reduction and the EGR abnormality diagnosis during consistent, maintained driving are performed when the performance frequency fEGR of the EGR abnormality diagnosis has not reached the required level. However, the performance frequency fEGR of the EGR abnormality diagnosis may be ensured by changing (easing) the performance condition for the EGR abnormality diagnosis, establishment of which is judged in Steps 701 through 707 in FIG. 15 (or Steps 801 through 807 in FIG. 17), according to the performance frequency fEGR of the EGR abnormality diagnosis. The diagnosing method or the judging condition may be changed in association with a change in the performance condition. Alternatively, the diagnosing method or the judging condition may be changed according to the performance frequency fEGR of the EGR abnormality diagnosis.

[Secondary Air Abnormality Diagnosis]

A program for a secondary air abnormality diagnosis detailed in FIG. 21 is run repetitively at regular intervals after the IG switch is turned ON, and an abnormality diagnosis for the secondary air introducing system 32 is performed as follows. That is, when this program is initiated, whether the performance condition for the secondary air abnormality diagnosis during idling is established or not is judged first in Steps 901 through 904. Here, the performance condition for the secondary air abnormality diagnosis during idling is established when all the following conditions (1) through (4) are satisfied.

(1) The atmospheric pressure is higher than a certain pressure (for example, 75.3 kPa), that is, the vehicle is not running at a high altitude (Step 901).

(2) The temperature of intake air is higher than a certain temperature (for example, −10° C.) (Step 902).

(3) The air-fuel ratio F/B control is being effected (Step 903).

(4) The vehicle is not moving (vehicle speed=0 km/h) during idling (Step 904).

When the secondary air introduction control is forcedly effected by performing the secondary air abnormality diagnosis while the vehicle is running, a large quantity of an exhaust gas burns inside the exhaust pipe 22, and the temperature of the catalyst 23 may exceedingly rise. This is the reason why the condition (4), that is, during idling, is provided as one of the conditions that needs to be satisfied to establish the performance condition for the secondary air abnormality diagnosis. Since a quantity of an exhaust gas is small during idling, the secondary air abnormality diagnosis can be performed without exceedingly raising the temperature of the catalyst 23.

When all the foregoing conditions (1) through (4) are satisfied, the performance condition for the secondary air abnormality diagnosis during idling is established, and the flow proceeds to Step 907 from Step 904 to perform the secondary air abnormality diagnosis during idling, which is described below.

On the other hand, when any of the foregoing conditions (1) through (4) is not satisfied, the performance condition for the secondary air abnormality diagnosis during idling fails to be established. However, when all the foregoing conditions (1) through (3) are satisfied (that is, when only the condition (4) is not satisfied), the flow proceeds to Step 905 from Step 904, where judgment is made as to whether the performance frequency fair of the secondary air abnormality diagnosis calculated by the aforementioned program for performance frequency calculation detailed in FIGS. 2 and 3 is below the required level (for example, 0.2).

When the performance frequency fair of the secondary air abnormality diagnosis is judged as having not reached the required level, the need to increase the performance frequency fair of the secondary air abnormality diagnosis by also performing the secondary air abnormality diagnosis during low load driving is judged, and the flow proceeds to Step 906. Then, judgment is made as to whether the vehicle is undergoing low load driving with the intake pipe pressure being lower than a certain pressure (for example, 33.3 kPa). When the vehicle is judged as experiencing low load driving with the intake pipe pressure being lower than the certain pressure, the performance condition for the secondary air abnormality diagnosis during low load driving is established, and the flow proceeds to Step 907 to perform the secondary air abnormality diagnosis during low load driving which is described below.

On the contrary, when the performance frequency fair of the secondary air abnormality diagnosis is judged as having reached the required level in Step 905, and it is also judged that the vehicle is undergoing medium to high load driving with the intake pipe pressure being at or higher than the certain pressure in subsequent Step 906, the program is terminated without performing the secondary air abnormality diagnosis during low load driving which is described below.

Both the secondary air abnormality diagnosis during idling and the secondary air abnormality diagnosis during low load driving are performed in Steps 907 through 912 as follows.

Figure 22:
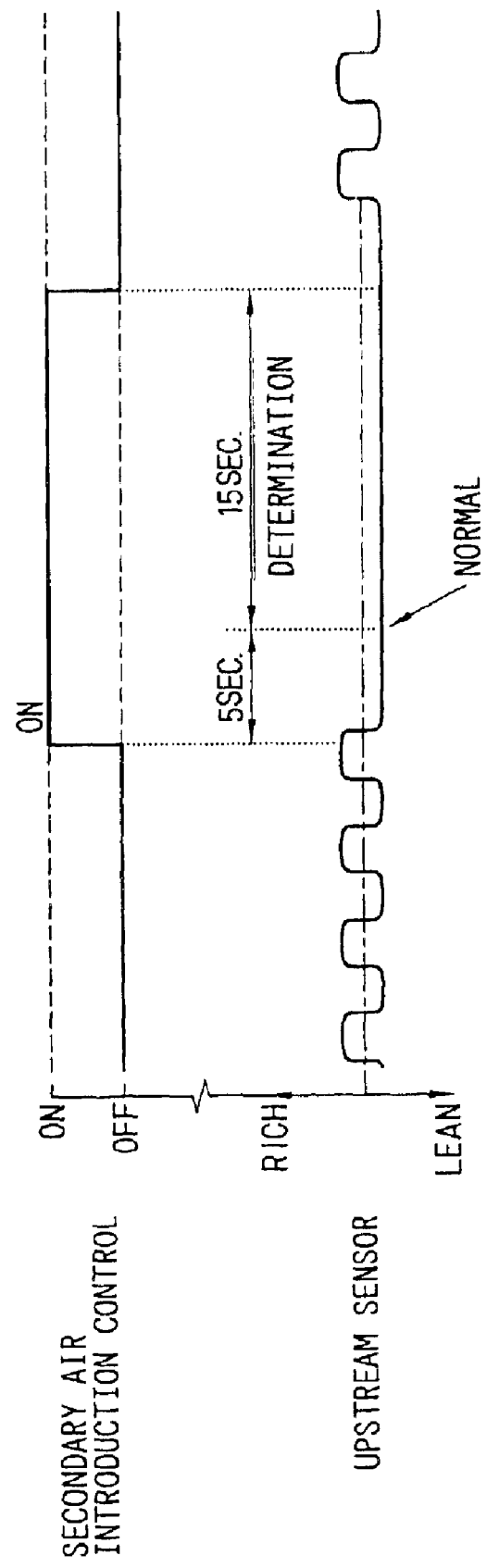
FIG. 22 is a view explaining a secondary air abnormality diagnosing method.

That is, in Step 907, judgment is made as to whether a certain time (for example, 5 sec.) has elapsed since the performance condition for the secondary air abnormality diagnosis during idling or low load driving was established. When the certain time has elapsed, the flow proceeds to Step 908, where the secondary air introduction control is started and the secondary air is introduced into the exhaust pipe 22. Since the air-fuel ratio is controlled to remain at the target air-fuel ratio (for example, stoichiometric air-fuel ratio) during the air-fuel ratio F/B control, the air-fuel ratio around the upstream side sensor 24 is lean (see FIG. 22) if the secondary air introducing system 32 is operating normally.

Then, the flow proceeds to Step 909, where whether a certain time (for example, 5 sec.) has elapsed since the start of the secondary air introduction control is judged. The flow proceeds to Step 910 when the certain time has elapsed from the determination that the air-fuel ratio around the upstream side sensor 24 is stable. Then, whether the lean state of the air-fuel ratio has continued for a certain time (for example, 15 sec.) is judged based on an output from the upstream side sensor 24.

When the lean state of the air-fuel ratio has not continued for the certain time, the flow proceeds to Step 911. Then, the presence of an abnormality in the secondary air introducing system 32 is judged, and the warning lamp is lit to warn the driver while an abnormality code representing the abnormality in the secondary air introducing system 32 is stored in the back-up RAM in the ECU 28. Subsequently, the flow proceeds to Step 912, where the performance times counter Nair for the secondary air abnormality diagnosis is incremented. The secondary air introduction control is terminated in subsequent Step 913, after which the program is terminated.

On the contrary, when the lean state of the air-fuel ratio is determined to have continued for the certain time in Step 910, the normality in the secondary air introducing system 32 is judged, and the flow proceeds to Step 912, where the performance times counter Nair for the secondary air abnormality diagnosis is incremented. The secondary air introduction control is terminated in subsequent Step 913, after which the program is terminated.

According to the processing as above, when the performance frequency fair of the secondary air abnormality diagnosis has reached the required level, only the secondary air abnormality diagnosis during idling is performed so as not to exceedingly raise the temperature of the catalyst 23. On the other hand, when the performance frequency fair of the secondary air abnormality diagnosis has not reached the required level, emphasis is placed upon an increase of the performance frequency fair of the secondary air abnormality diagnosis. Hence, both the secondary air abnormality diagnosis during idling and the secondary air abnormality diagnosis during low load driving are performed, and the performance frequency fair of the secondary air abnormality diagnosis is thus increased.

Consequently, the performance frequency fair of the secondary air abnormality diagnosis can be maintained at or above the required level under the condition that the conventional secondary air abnormality diagnosing method fails to ensure the performance frequency fair of the secondary air abnormality diagnosis sufficiently. Hence, should an abnormality occur in the secondary air introducing system 32, the abnormality can be detected at an early stage. Meanwhile, if the performance frequency fair of the secondary air abnormality diagnosis is placed under control by regulation in the future, it is possible to increase the performance frequency fair of the secondary air abnormality diagnosis to reach the level required by regulation.

The present embodiment is configured in such a manner that only the secondary air abnormality diagnosis during idling is performed when the performance frequency fair of the secondary air abnormality diagnosis has reached the required level, while both the secondary air abnormality diagnosis during idling and the secondary air abnormality diagnosis during low load driving are performed when the performance frequency fair of the secondary air abnormality diagnosis has not reached the required level. However, the performance frequency fair of the secondary air abnormality diagnosis may be ensured by changing (easing) the performance condition for the secondary air abnormality diagnosis according to the performance frequency fair of the secondary air abnormality diagnosis. The diagnosing method or the judging condition may be changed in association with a change in the performance condition. Alternatively, the diagnosing method or the judging condition may be changed according to the performance frequency fair of the secondary air abnormality diagnosis.

Also, in the present embodiment, the abnormality diagnosing condition (performance condition, diagnosing method, and judging condition) is switched in two steps according to the performance frequency of the abnormality diagnosis. However, it may be switched in three or more steps.

The applicable range of the invention is not limited to the catalyst deterioration diagnosis, the leakage diagnosis, the EGR abnormality diagnosis, and the secondary air abnormality diagnosis. The invention can be applied to abnormality diagnoses for various components and systems mounted on the vehicle. The invention can be applied to, for example, an abnormality diagnosis for an exhaust gas sensor (a linear air-fuel ratio sensor, an oxygen sensor, etc.), an abnormality diagnosis for a fuel pump, an abnormality diagnosis for a fast-heating catalyst system, an abnormality diagnosis for a variable valve system, an abnormality diagnosis for an ignition system, an abnormality diagnosis for an air-fuel ratio control system, an abnormality diagnosis for a throttle control system, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An abnormality diagnosing apparatus for a vehicle, comprising:
    an abnormality diagnosing means for diagnosing presence or absence of an abnormality in a vehicle component or vehicle system; and
    a performance frequency calculating means for calculating a performance frequency of an abnormality diagnosis performed by said abnormality diagnosing means, wherein
    said abnormality diagnosing means changes at least one abnormality diagnosing condition selected from a performance condition, a diagnosing method, and a judging condition for the abnormality diagnosis according to the performance frequency calculated by said performance frequency calculating means.

2. The abnormality diagnosing apparatus for a vehicle according to claim 1, wherein:
    when the performance frequency calculated by said performance frequency calculating means has not reached a certain required level, said abnormality diagnosing means changes said abnormality diagnosing condition to increase the performance frequency.

3. The abnormality diagnosing apparatus for a vehicle according to claim 1, further comprising:
    a catalyst for purifying internal combustion engine exhaust gases,
    wherein said abnormality diagnosing means diagnoses a presence or an absence of deterioration in said catalyst.

4. The abnormality diagnosing apparatus for a vehicle according to claim 2, further comprising:
    a catalyst for purifying internal combustion engine exhaust gases, wherein said abnormality diagnosing means diagnoses a presence or an absence of deterioration in said catalyst.

5. The abnormality diagnosing apparatus for a vehicle according to claim 1, further comprising:
an evaporative gas purge system for purging an evaporative gas, which is generated when fuel inside a fuel tank evaporates, from the inside of the fuel tank to an intake system of an internal combustion engine,
wherein said abnormality diagnosing means diagnoses a presence or an absence of leakage in an evaporation system including the fuel tank.

6. The abnormality diagnosing apparatus for a vehicle according to claim 2, further comprising:
an evaporative gas purge system for purging an evaporative gas, which is generated when fuel inside a fuel tank evaporates, from the inside of the fuel tank to an intake system of an internal combustion engine,
wherein said abnormality diagnosing means diagnoses a presence or an absence of leakage in an evaporation system including the fuel tank.

7. The abnormality diagnosing apparatus for a vehicle according to claim 4, further comprising:
an evaporative gas purge system for purging an evaporative gas, which is generated when fuel inside a fuel tank evaporates, from the inside of the fuel tank to an intake system of an internal combustion engine,
wherein said abnormality diagnosing means diagnoses a presence or an absence of leakage in an evaporation system including the fuel tank.

8. The abnormality diagnosing apparatus for a vehicle according to claim 5, wherein:
said abnormality diagnosing means performs a leakage diagnosis for the evaporation system while the internal combustion engine is operating and when the performance frequency calculated by said performance frequency calculating means has reached a certain required level, and performs the leakage diagnosis for the evaporation system while the internal combustion engine is stopped when the performance frequency has not reached the certain required level.

9. The abnormality diagnosing apparatus for a vehicle according to claim 7, wherein:
said abnormality diagnosing means performs a leakage diagnosis for the evaporation system while the internal combustion engine is operating and when the performance frequency calculated by said performance frequency calculating means has reached a certain required level, and performs the leakage diagnosis for the evaporation system while the internal combustion engine is stopped when the performance frequency has not reached the certain required level.

10. The abnormality diagnosing apparatus for a vehicle according to claim 5, wherein:
said abnormality diagnosing means performs a leakage diagnosis for the evaporation system while the internal combustion engine is idling when the performance frequency calculated by said performance frequency calculating means has reached a certain required level, and performs the leakage diagnosis for the evaporation system also under operating conditions other than idling when the performance frequency has not reached the certain required level.

11. The abnormality diagnosing apparatus for a vehicle according to claim 7, wherein:
said abnormality diagnosing means performs a leakage diagnosis for the evaporation system while the internal combustion engine is idling when the performance frequency calculated by said performance frequency calculating means has reached a certain required level, and performs the leakage diagnosis for the evaporation system also under operating conditions other than idling when the performance frequency has not reached the certain required level.

12. The abnormality diagnosing apparatus according to claim 1, further comprising:
an exhaust gas recirculation system for recirculating portions of an exhaust gas from an internal combustion engine and into an intake system,
wherein said abnormality diagnosing means diagnoses a presence or an absence of an abnormality in said exhaust gas recirculating system.

13. The abnormality diagnosing apparatus according to claim 11, further comprising:
an exhaust gas recirculation system for recirculating portions of an exhaust gas from an internal combustion engine and into an intake system,
wherein said abnormality diagnosing means diagnoses a presence or an absence of an abnormality in said exhaust gas recirculating system.

14. The abnormality diagnosing apparatus according to claim 1, further comprising:
a secondary air introducing system for introducing secondary air into an exhaust channel of an internal combustion engine,
wherein said abnormality diagnosing means diagnoses a presence or an absence of an abnormality in said secondary air introducing system.

15. The abnormality diagnosing apparatus according to claim 13, further comprising:
a secondary air introducing system for introducing secondary air into an exhaust channel of an internal combustion engine,
wherein said abnormality diagnosing means diagnoses a presence or an absence of an abnormality in said secondary air introducing system.

16. A method of diagnosing an abnormality for a vehicle, the method comprising:
diagnosing a presence or an absence of an abnormality in a vehicle component or vehicle system;
calculating a performance frequency of a performed abnormality diagnosis; and
changing at least one abnormality diagnosing condition selected from a performance condition, a diagnosing method, and a judging condition for the abnormality diagnosis according to the calculated performance frequency.

17. The method according to claim 16, wherein when the calculated performance frequency has not reached a certain required level, said abnormality diagnosing condition is changed so as to increase the performance frequency.

18. The method according to claim 16, wherein diagnosing the presence or absence of an abnormality comprises diagnosing a presence or an absence of deterioration in catalyst for purifying internal combustion engine exhaust gases.

19. The method according to claim 16, wherein diagnosing the presence or absence of an abnormality comprises diagnosing a presence or an absence of leakage in an evaporation system including a fuel tank of the vehicle.

20. The method according to claim 19, wherein:
a leakage diagnosis is performed for an evaporation system of the vehicle while an internal combustion engine of the vehicle is operating and when the calculated performance frequency has reached a certain required level, and a leakage diagnosis is performed for the evaporation system while the internal combustion engine is stopped when the calculated performance frequency has not reached the certain required level.

21. The method according to claim 19, wherein:
a leakage diagnosis is performed for an evaporation system of the vehicle while an internal combustion engine of the vehicle is idling when the calculated performance frequency has reached a certain required level, and a leakage diagnosis is performed for the evaporation system also under operating conditions other than idling when the calculated performance frequency has not reached the certain required level.

22. The method according to claim 16, wherein diagnosing the presence or absence of an abnormality comprises diagnosing a presence or an absence of an abnormality in an exhaust gas recirculating system for recirculating portions of an exhaust gas from an internal combustion engine of the vehicle to an intake system of the vehicle.

23. The method according to claim 16, wherein diagnosing the presence or absence of an abnormality comprises diagnosing a presence or an absence of an abnormality in a secondary air introducing system for introducing secondary air into an exhaust channel of an internal combustion engine of the vehicle.

* * * * *